May 9, 1967  D. S. OLIVER  3,319,231
DATA PROCESSING APPARATUS FOR RETRIEVING
INFORMATION-BEARING MEDIA
Original Filed Aug. 17, 1961  12 Sheets-Sheet 2
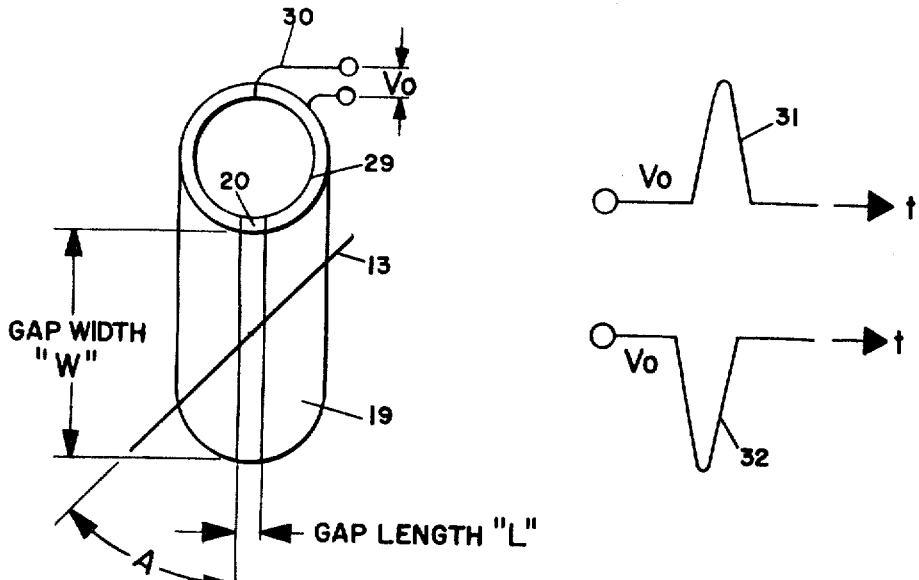
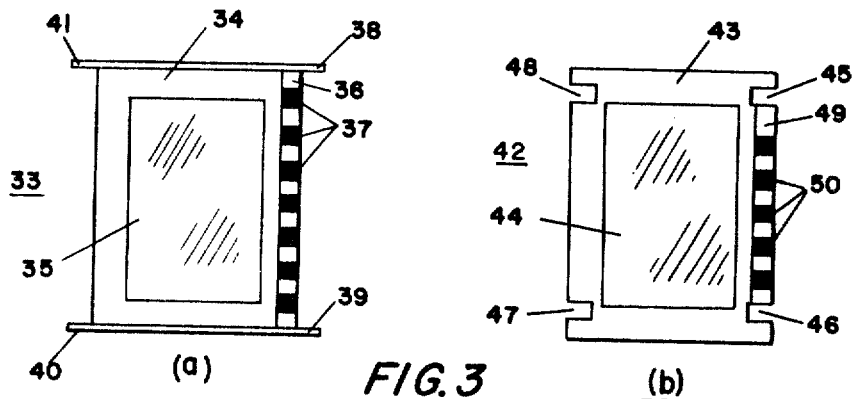
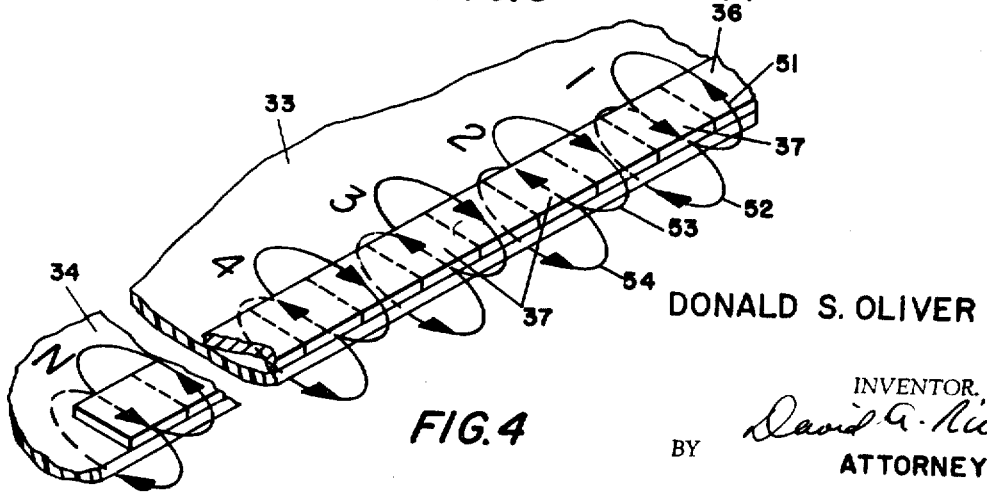
INVENTOR.
DONALD S. OLIVER
BY David G. Rich
ATTORNEY.

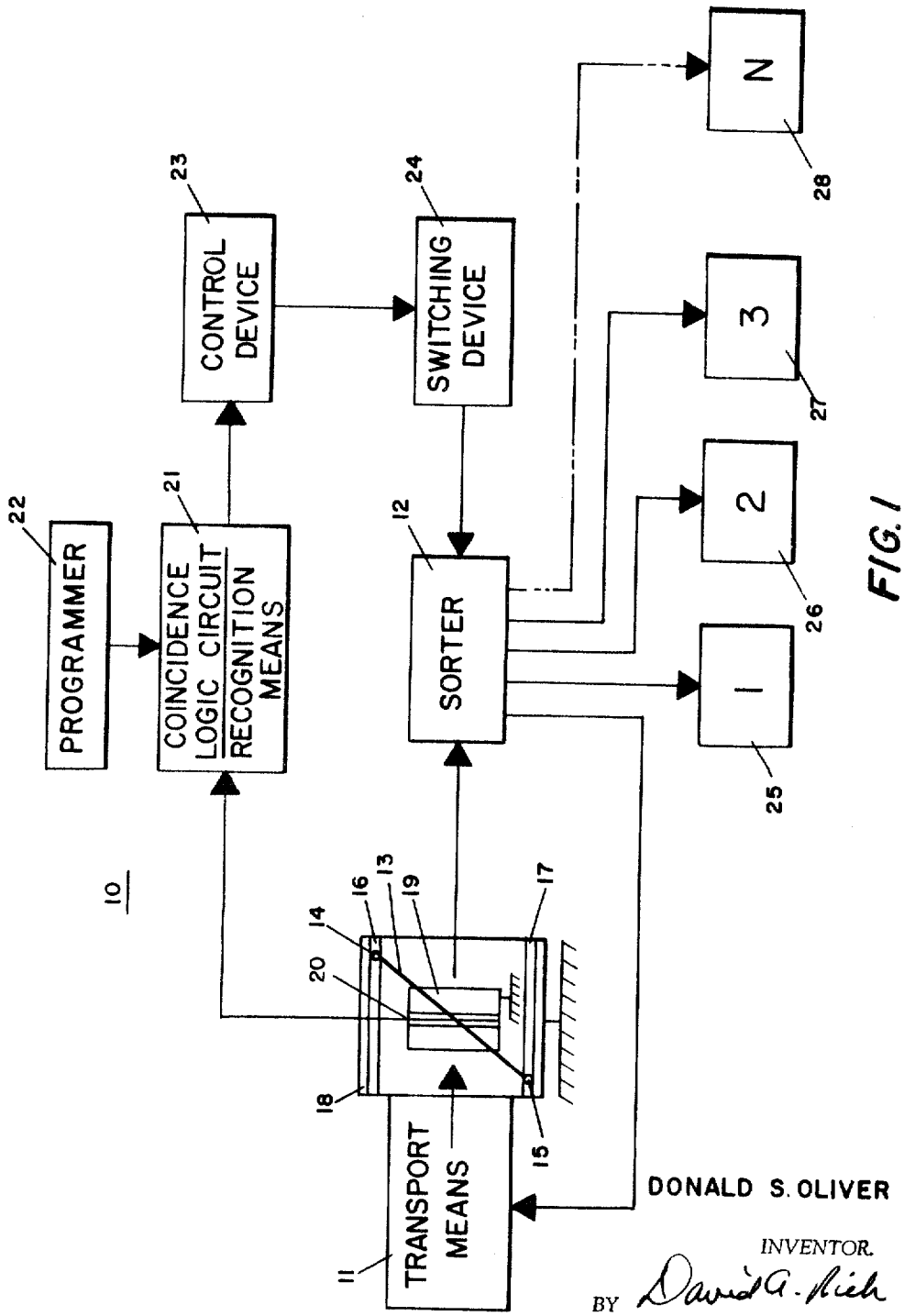

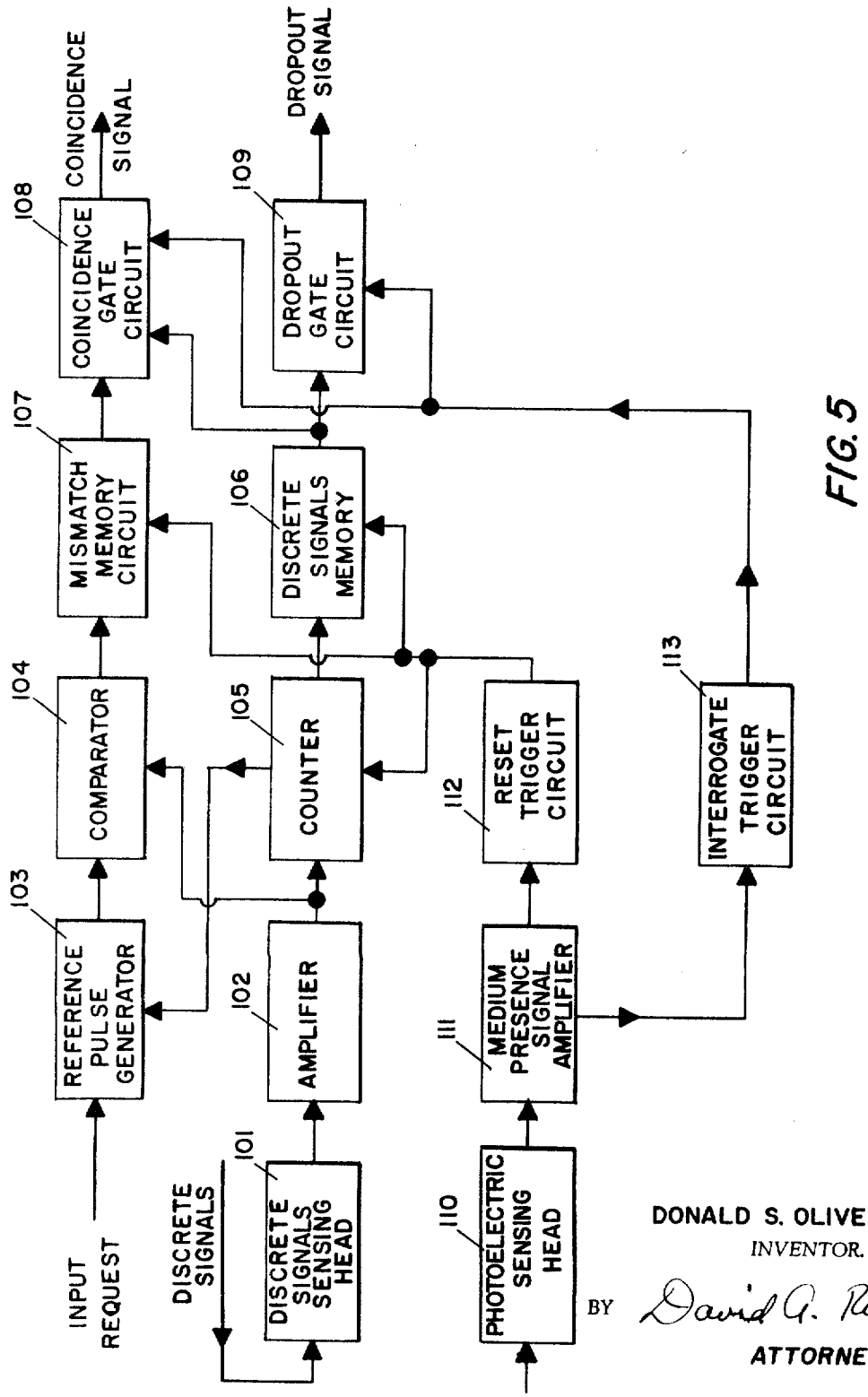

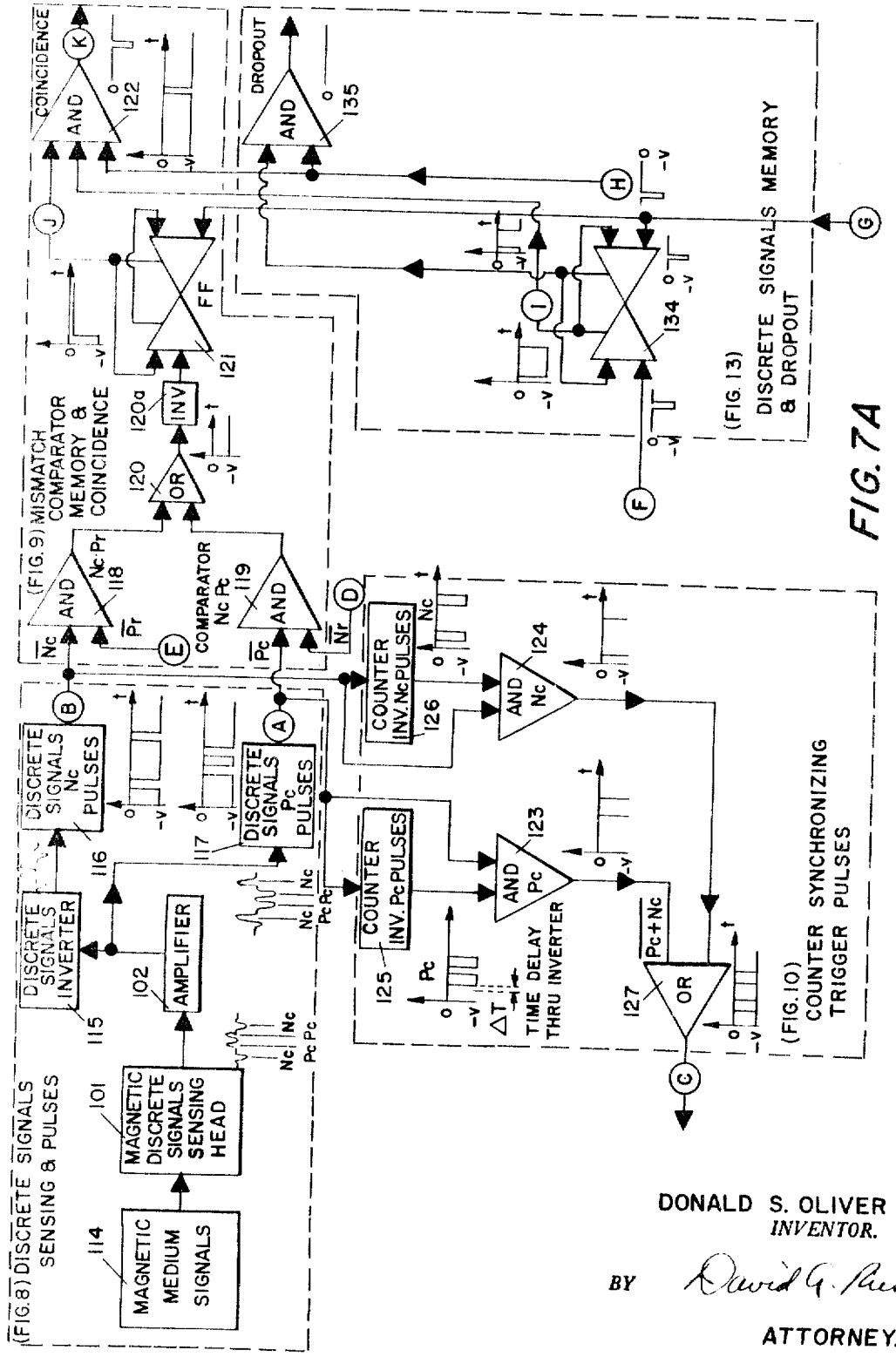

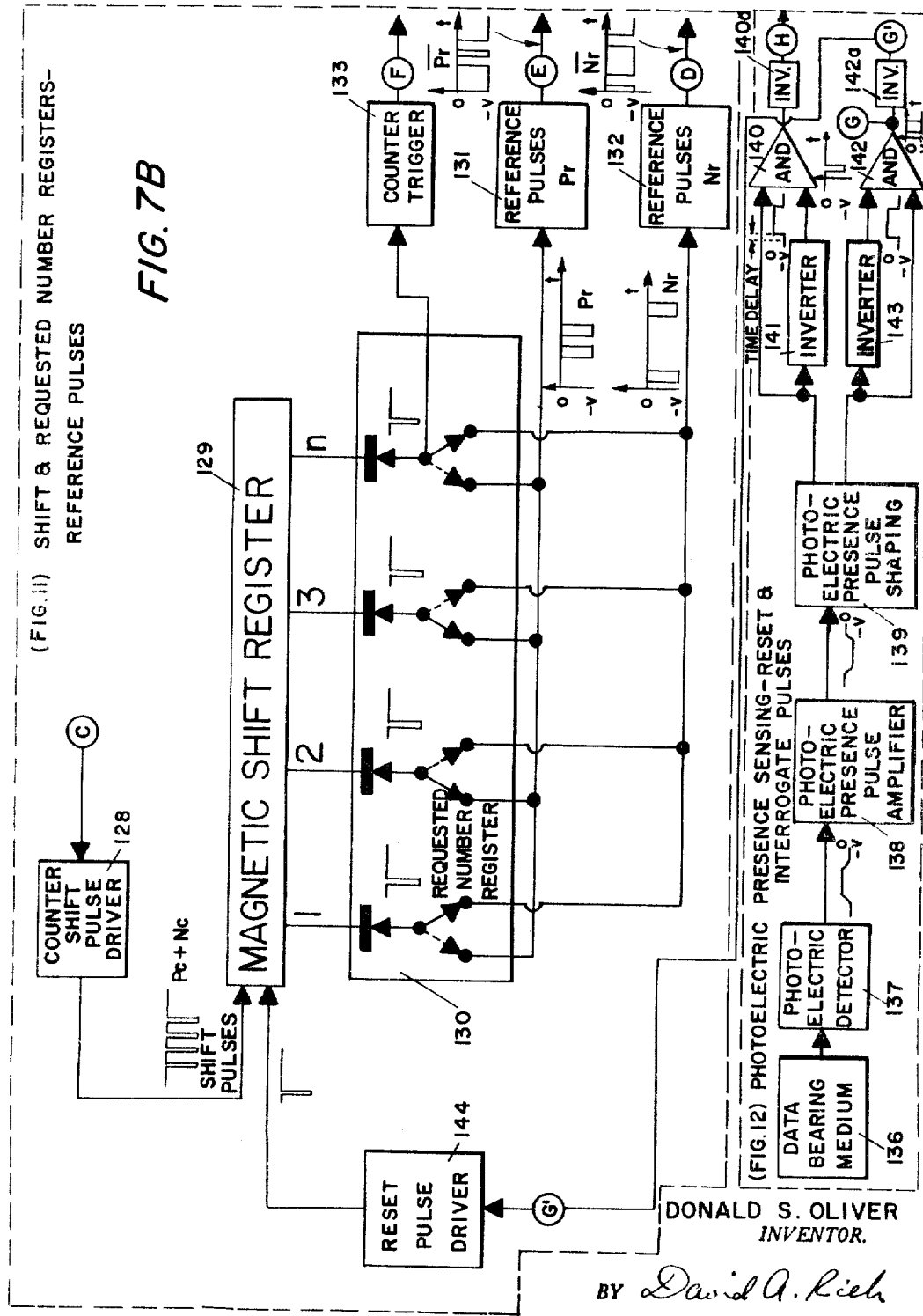

DONALD S. OLIVER
INVENTOR.

BY David A. Rich

ATTORNEY.

United States Patent Office 3,319,231
Patented May 9, 1967

3,319,231
DATA PROCESSING APPARATUS FOR RETRIEVING INFORMATION-BEARING MEDIA
Donald Sears Oliver, West Acton, Mass., assignor to Itek Corporation, Lexington, Mass., a corporation of Delaware
Continuation of application Ser. No. 132,141, Aug. 17, 1961. This application Nov. 4, 1965, Ser. No. 513,630
7 Claims. (Cl. 340—172.5)

This application is a continuation of my United States application, Ser. No. 132,141, filed Aug. 17, 1961, and assigned to the same assignee as the present invention.

The present invention relates to data processing. More particularly, the invention relates to data processing systems for transporting, locating, segregating, retrieving and reading of data bearing media. More especially, the invention relates to a data processing circuit for sensing and processing identification code data indicia carried by graphic data bearing cards or chips, such as photographic cards or chips. The term "data bearing medium or media" as used herein includes data bearing bodies, such as film chips, cards and sheets, and the frame carriers to support the bodies. The term further includes such bodies integrally formed with a carrier means.

In a copending application filed by Donald S. Oliver, entitled, Magnetic Data Processing, filed Apr. 12, 1960, Ser. No. 21,754, now abandoned, a data processing system is described. The present invention presents an improvement over that apparatus. In another copending application filed by Donald S. Oliver entitled, Data Processing Device, filed on the same date herewith, an improvement in the sensing device is presented enabling serial read-out of identification code signals. In the earlier filed Oliver apparatus, a data bearing medium such as a film chip, photographic transparency or positive, cooperates with a guide transport system which slidably engages and supports the medium at an oblique angle. The media are preferably propelled under the influence of the flow of air.

In order to identify a given medium and program a desired path of transport, for purposes of selection, retrieval, recycling, etc., each medium is identification coded with a data code preferably magnetically recorded. A magnetic striping in this system is applied either to a film chip, or a carrier frame for the film chip, coplanar with the plane of the medium. The striping is recorded transversely and polarized across the face of the striping or magnetic tape. The polarization is preferably perpendicular to an edge of a rectangular medium. Fringe fields extend from the medium at the edge. The recording thus provides recorded data indicia which are linearly disposed at discrete intervals. Since the identification code can be polarized either with a north pole field fringing from the edge of the medium or with a south pole field fringing from the edge, a positive signal indicative of the presence of binary information is obtainable. In the event that a signal below a predetermined threshold value appears in the interval sensed, the medium is assumed to be defective in structure and/or function and is extracted from the system.

As noted above, the normal plane of a medium is at an oblique angle relative to its direction of motion. In the co-pending Oliver apparatus, a magnetically edge-coded chip is transported at an angle past a multi-channel magnetic sensing means. The means includes a number of individual heads which are disposed corresponding with the position of an identification code indicium interval.

In contrast with the earlier filed Oliver apparatus, the present invention is distinguishable in that linearly disposed data indicia are received in sequence, thus eliminating the requirement of a plurality of parallel input circuits.

It is desirable to determine the presence of a data bearing media, sense its identification code, verify the code as a true signal and decide whether the particular medium has to be acted on in accordance with a preselected program.

In a typical application, a data bearing medium is in motion wtih respect to a sensing head. In the prior art, a reference signal is compared with an input signal within a given time interval. For the most general application, however, the velocity of the medium relative to the sensing head is subject to considerable variation. Furthermore, the rate at which media may be read is limited by the time requirement for a given reading. In contrast with the above, the data processing circuit of the present invention enables the recognition of a desired signal without regard to time. The present system thus operates to provide identification code recognition without unduly limiting the characteristic of signals with which it can operate.

It is therefore an object of the invention to provide an improved data processing circuit.

It is further the object of the invention to provide an improved data processing circuit for data bearing media carrying identification code data and indicia.

Another object of the invention is to provide an improved data processing circuit for determining the presence of a data bearing medium. Still another object of the invention is to provide an improved data processing circuit enabling rapid read-out from a data bearing medium in motion.

Still another object of the invention is to provide an improved data processing circuit enabling the recognition of an identification code from data indicia carried by graphic data bearing media.

Yet another object of the invention is to provide an improved data processing circuit characterized by simplicity of structure and ease of operation.

A further object of the invention is to provide an improved data processing circuit for data bearing media having magnetically recorded identification code data indicia.

Still another object of the invention is to provide an improved data processing circuit for rapid, efficient and accurate processing of magnetically recorded identification code data indicia carried by data bearing media.

In accordance with the invention, there is provided a data processing circuit. The circuit includes a receiver means for receiving a sequence of discrete signals. The receiver means includes a reference means for providing a preselected signal of a predetermined number of reference pulses. Comparator means are coupled to the receiver and reference means for comparing successive signals and reference pulses. In this manner, a comparator signal is produced in accordance with a difference in a selected characteristic between successive signals and reference pulses. Counting means are coupled to the receiver means for producing a counting signal in accordance with the number of discrete signals. Control means are coupled to the comparator and counting means for producing a control signal in response to the counting and comparator signals.

In one form of the invention, the discrete signals are derived from magnetically recorded, linearly disposed identification code data indicia. In another form of the invention, the received signals are discrete pulses and are compared, pulse for pulse, with the reference pulses. The comparator means produces a difference signal only in response to the first difference in a selected characteristic between a received signal and its corresponding reference pulse. The control means produces a control signal only if the number of received signals compared is the same as the predetermined number of reference pulses, and no difference signal is derived from the comparator.

Other and further objects of the invention will be apparent from the following description of the invention taken with reference to the accompanying drawings.

In the drawings:

FIG. 1 is a schematic diagram of a data processing system embodying the present invention;

FIG. 2 is an enlarged, schematic, partially perspective view of a magnetic sensing head used in accordance with the invention;

FIG. 3 is a plan view of a data bearing medium useful in a data processing system embodying the present invention;

FIG. 4 is an enlarged, fragmentary, partially schematic perspective view of a magnetic tape-bearing, data bearing medium useful in accordance with the invention;

FIG. 5 is a schematic block diagram of a data processing circuit embodying the invention;

FIGS. 7A and 7B are a detailed, schematic block diagram of a data processing circuit embodying the invention;

*Background and description of the invention*

Figure 6:
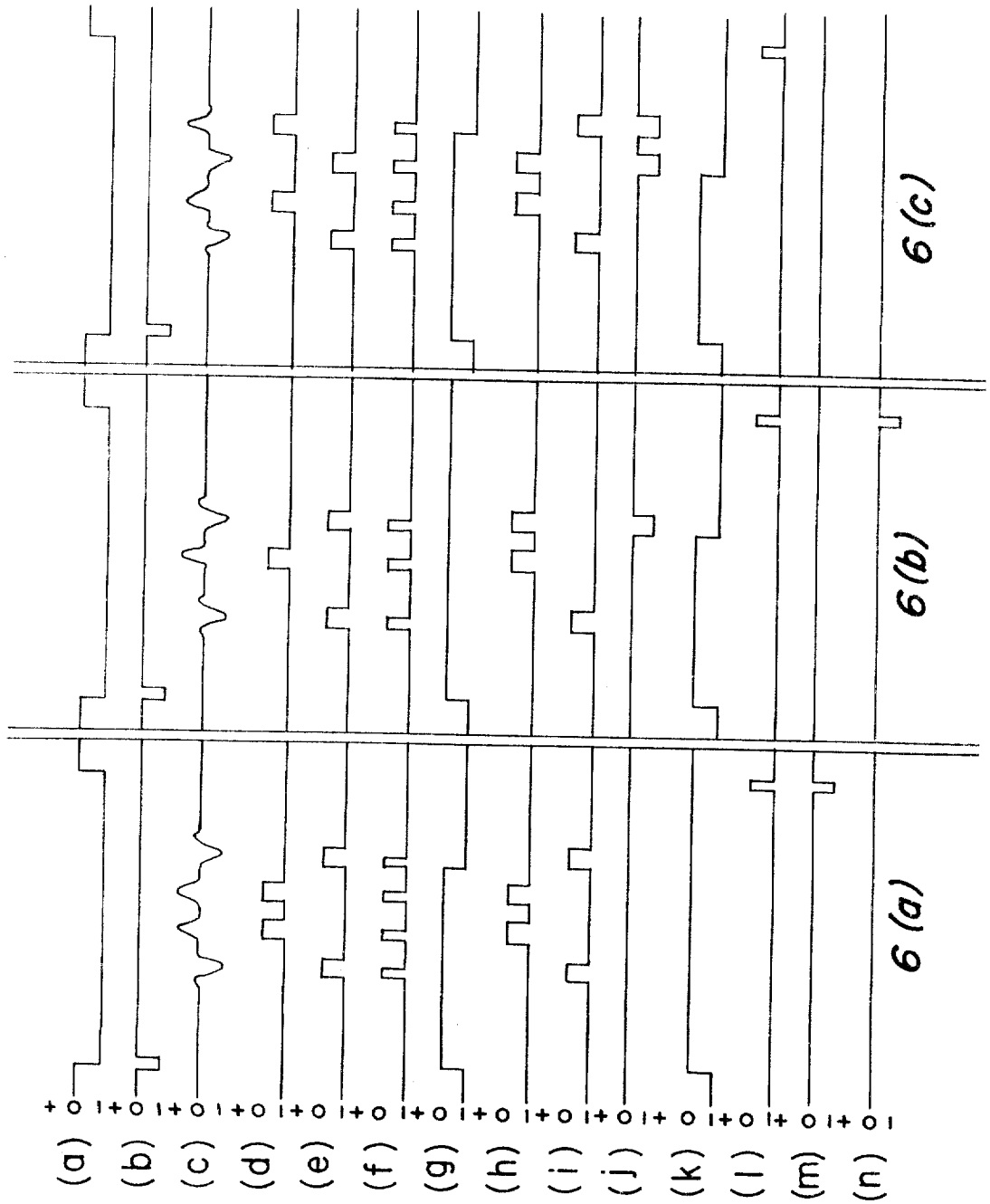
FIG. 6 is a graph of voltages associated with the circuit of FIG. 7.

The invention is concerned with data processing involving the ordering, presentation and use of data in various physical forms including graphic data, and the systems, methods, apparatus and devices for handling data bearing media carrying visually presented or graphic information, as well as abstract digital or analogue information for use in machines. Of particular concern is the handling of discrete information elements such as film cards or film chips. Such data processing systems require techniques for converting an informtaion file into discrete elements, transporting each such discrete element from a file to a point of detection, than to a point of switching and finally to a point of readout, either visually or by machine.

The invention includes methods and apparatus for handling small unmounted film chips as well as larger sections of film called herein "film cards" to distinguish them from the small unmounted "film chips." The handling of the larger film cards in data media preferably involves a supporting carrier frame in addition to the film in itself. The frame is used as a carrier and can therefore carry a number of types of data bearing media.

The chip or card may provide its own support or carrier means.

Data bearing cards, aperture cards or punched cards, for example, can be used equally well as a carrier for photographic film chips. The film cards may be coded to provide inherent control of a selection, distribution, recycling etc. For various applications, magnetic coding, optical coding, and mechanical coding, such as provided by notches, are useful. A magnetic striping adjacent an edge of a carrier or data bearing body is highly desirable for edge scanning to identify a desired medium rapidly. Since a photograph contains an enormous amount of information per unit area, it is frequently desirable to utilize optical coding on the face of a data bearing body or its carrier combined with magnetic and mechanical coding adjacent an edge.

Sections of guide panels have guide tracks to receive a data bearing medium such as a film card and carrier frame. The medium is propelled along the track channels and is normally inclined at an angle of approximately 45° to the track. The medium is free to move in either direction along the track channels. A number of media may be stacked in a section of track channels. Each medium may be driven along the tracks by an air stream. In this manner there is no problem with friction between the surfaces of film cards mounted on adjacent carriers. For a given system, sections of track are joined for various functions. Means may be provided for trapping and holding an individual medium.

The medium is transported to and stored in various types of bins, each of which includes a basic section of track. The bins may be permanently mounted or movable. The bins are so constructed as securely to hold the media in place. The bin is adapted for insertion into an automatic system with, for example, air stream propulsion or for insertion into a manually controlled handling unit for use as a local file.

While it is normally desirable to transport media oriented at an angle relative to the track, for many purposes it is necessary to move or hold the medium in its own plane. Special sections of track can be provided to convert the orientation of the medium from inclined plane motion to motion in its own plane or any angle in between. For static viewing, contact printing or readout, a selected medium may be trapped and held or moved in its own plane for viewing of its various parts.

Recirculation may be obtained by combining selected sections of track and properly directing fluid drive means to provide, for example, a suitable air stream operative at all points along a desired path. The ability to merge or intermix cards is incorporated in the recirculation system.

Magnetic edge coding greatly enhances the speed and ease with which an individual medium may be identified and selected. A strip of ferro-magnetic material is attached along the surface of the medium adjacent to an edge. Magnetic coding is provided by recording signals having relative positive or negative magnetic polarity at right angles to the edge. The code can be edge-sensed while the medium is moving at high speed and at an angle. A magnetic sensing head may be located in coupling proximity with media moving in a section of track. The preferred coding system used herein requires a definite signal above a desired threshold. Absence of such a definite magnetic signal indicates a defect and produces rejection of the medium. The present system contemplates the use of a serial readout which greatly simplifies the related coincidence logic circuitry.

*Principles of operation*

In the prior art a number of systems have been proposed that use an angularly oriented magnetic sensing gap with respect to the direction of motion of a magnetically recorded tape and particularly with respect to the surface of the tape disposed adjacent the gap. The present invention is distinguishable from these devices in that linearly disposed discrete information is serially read out by a magnetic sensing head with the gap width disposed at an angle with respect to the linear disposition of the data.

In the case of magnetic recording, as a magnetically recorded indicium moves past a gap in a magnetic sensing head, its field produces a flux which links with the sensing head winding. A voltage is induced in the windings in proportion to the time rate of change of the flux linking the winding. The amplitude of the voltage generated is unaffected by the relative location of the passing magnetic bit with respect to its disposition along the width of the head gap. Thus a single wide gap head may be used to sense a plurality of magnetically recorded indicia by means of serial read-out. The disposition of each indicium with respect to the line of the gap width, or sensing axis, in no way affects the amplitude of the voltage output of the sensing head. The voltage output of the head corresponds with the amplitude and polarity of a magnetic indicium. Thus, the polarity of a discrete electrical signal is determined by the polarity of the recorded signal. In the event that no signal is present, this indicates a defect.

The motion of the magnetic tape past a magnetic sensing head produces a change in the magnetic flux circuit to include the magnetic path in the head. This in turn produces the excitation of a surrounding winding which produces an electrical signal. This output voltage is either positive or negative to produce a positive or negative signal indicative of a binary code. In accordance with such a code, for example, 0 may imply a positive pulse and 1 may imply a negative pulse.

The linear display of information is readily applied longitudinally along the edge of a magnetic tape. Reading planar data bearing media by exposing an edge of the medium to a sensing head is superior to face reading the medium. It enables, for example, ready scanning of a plurality of media in rapid efficient sequence.

In the present invention, then, linearly disposed discrete information indicia are moved past a sensing head at an angle relative to a sensing axis. The sensing head produces a sequence of discrete signals. The signals may be discrete, for example, in the sense that a given characteristic such as polarity successively changes. This change may only be apparent with respect to a given receiver input sensitivity threshold. Thus, a conventional sine wave in this sense provides a sequence of discrete signals with respect, for example, to polarity.

An input program is selected for in turn selecting a specific data bearing medium with regard to a specific function. In order to recognize a desired medium, a preselected sequence of a predetermined number of reference pulses is provided in accordance with a desired program. The received discrete signals in sequence are compared, signal for pulse, with the reference pulses. For complete coincidence, indicating the presence of a desired medium, the input signals and reference pulses must agree, for example, in polarity. As soon as a difference in polarity is indicated, the medium is rejected as not being the desired one.

In the event that there is complete agreement signal for pulse, an indication that this medium is indeed the desired medium takes place. Note that comparison takes place independent of time. As each received signal comes along, it is compared with the next reference pulse in succession. The comparator, however, only looks for mismatches.

In the application involving magnetically recorded identification code data indicia, the signals are magnetically polarized to provide an output electrical signal of an electrical polarity corresponding with magnetic polarity. That is to say, a north magnetic pole, for example, may correspond with a positive electrical voltage amplitude, and a south magnetic pole may correspond with a negative electrical voltage amplitude. The absence of a signal from the medium indicates a defect.

The true signal verification and insurance against spurious signals takes place in two major steps. A photoelectric sensing element, for example, may sense the presence of a medium, enabling the comparison, counting and control functions. After the medium passes the photoelectric sensor, these functions may be disabled. True signal verification thus takes place by virtue of a determination as to the presence of the medium, enabling the comparison, counting and control functions only during the presence of the medium. Additionally, the received signals are counted to insure the correct number as compared with a predetermined number of reference pulses. In the event that the medium interrogated provides less than the predetermined number of signals, the medium is extracted from the system.

*Explanation and description of the data processing device in FIGS. 1-4*

Referring now to the drawings, and with particular reference to FIGURE 1, there is here illustrated a data processing device embodying the invention.

The device as illustrated generally comprises a transport means coupled to a sorting means for propelling and distributing data bearing media. The sorting means is in turn coupled to storage bins or other desired paths. The sorting means is also coupled back to the transport means for recycling. The transport and sorting means generally comprise an open guide system. Coupled to the guide system along the path of a data bearing medium is a magnetic sensing means. The head is coupled to a recognition means including a coincidence logic circuit which derives an input from a programmer. The output of the logic circuit is coupled to a control circuit which in turn is coupled to a switching device. The switching device is coupled to the sorter for directing selected media along selected predetermined paths.

Thus referring to FIG. 1 there is here illustrated a data processing device generally indicated at 10. The device includes an open guide system having a transport means 11 coupled to a sorting means 12. A data bearing medium 13 is shown guided at an oblique angle relative to its direction of travel. The data bearing medium 13 has a pair of extension tab means 14 and 15 engaging a pair of spaced parallel track channels 16 and 17 which are formed in a supporting panel 18. A magnetic sensing head 19 is shown coupled to the guide path adjacent an edge of a moving medium 13. The head includes a sensing gap 20 presenting a sensing axis. As will be more fully described below, the head basically comprises ferro-magnetic material formed in the shape of an incomplete loop which defines a gap. The width of the gap presents a sensing axis perpendicular to the direction of motion of the medium 13. There is an angle between the plane of the medium 13 and the line of the width of the gap 20 or the sensing axis. The head 19 is coupled to a recognition means 21 including a coincidence logic circuit. Coupled to the recognition means is a programmer 22. The means 21 are coupled to a control circuit 23 which in turn is coupled to a switching means 24. The switching means is coupled in controlling relation to the sorter 12. The sorter 12 is coupled to the input of the transport means 11 for recycling purposes. The sorter is also coupled to a plurality of storage bins 25, 26, 27 and 28. The bins as shown are indicated as being numbered from 1 through N implying that an arbitrary number of bins are useful in the present device.

In FIG. 2 the relative orientation of the data bearing medium 13 to the line of the gap width 20, the sensing-axis, is shown. As indicated in FIG. 2, the medium 13 is oriented at an angle A with respect to the sensing axis defined by the gap 20 and moves past the gap length L. The sensing head 19 includes a magnetic core 29 surrounded by an inductive winding 30 from which an output voltage $V_0$ is derived. The output voltage $V_0$ generally has the form indicated at 31 or 32 depending upon the polarity of the magnetically recorded signal. The curves 31 and 32 represent signal amplitude $V_0$ taken against a time base $t$.

In FIGURE 3 two of the many forms of data bearing media useful with the present invention are shown. FIG. 3(a) presents a data bearing medium of the type used with four spaced track channels formed in a pair of parallel supporting panels. Here the medium generally indicated at 33 has a carrier frame 34 which carries a film card or chip 35. Along one edge of the frame and substantially co-planar with the frame and chip is a magnetic striping 36. The magnetic striping 36 carries magnetically recorded identification code indicia 37. The film chip or card 35 carries data in various graphic forms.

The indicia 37 are linearly disposed along an edge of the medium 33 as shown. The magnetic recording and hence the polarized magnetic signals are transverse to the longitudinal direction of the magnetic striping. The carrier is affixed to a pair of cylindrical rods providing tab extensions 38, 39, 40 and 41. The extensions are adapted for engagement with a system of track channels for guiding the medium along a desired path. The channels are characteristically so spaced as to cause the medium to assume an orientation at an angle relative to the track as well as relative to the direction of travel.

If the medium 33 were to move past the gap 20 with the linearly disposed indicia parallel to the sensing axis, the single wide gap sensing head would only see a net differential flux which would produce in its output a signal representative of the integrated effect of the individual magnetic bits. In order to obtain serial readout the medium must be oriented in such a manner as to provide the line of indicia at an angle with respect to the sensing axis. Each indicium is disposed at discrete intervals so chosen with respect to the orientation angle A as to provide isolated indicium, i.e. an isolated signal for readout at a given time.

In FIG. 3(b) a data bearing medium adapted for use with track rails is shown. Here a medium generally indicated at 42 is shown. The medium 42 includes a carrier 43 and film chip or card 44 supported by the carrier frame 43. The carrier frame is so formed as to provide a system of four notches 45, 46, 47 and 48 in opposed pairs in spaced relation. The medium is thus adapted for engagement with a system of parallel, spaced track rails which support the medium by engagement with the notches. Again the spacing between the rails is such as to support the medium at an angle relative to its direction of motion. Along an edge of the medium is a magnetic striping 49 with linearly disposed identification code indicia 50.

While the media in FIG. 3 illustrates the identification code striping applied to the frame, it will be apparent that the code may be applied to an integrally formed film chip or card which provides its own support or carrier. In such a case the film chip or card is so formed as to provide either notches or tab extensions for guidance along track rails or track channels respectively.

Referring now to FIG. 4, there is here illustrated an enlarged fragmentary view of a preferred embodiment of the magnetic striping section of the data bearing medium 33. In this view the magnetic flux lines are schematically illustrated. Each digit of the identification code is separated by a discrete interval bounded by dashed lines as shown. The ferro-magnetic material is carefully magnetized at spaced discrete intervals to minimize intercoupling.

FIG. 4 particularly shows the magnetic striping 36 which carries the indicia linearly disposed at discrete intervals. Each identification code indicium is recorded transversely of the magnetic striping or magnetic tape. Such a tape is typically formed of a plastic carrier with an iron oxide suspension. The well known magnetic tape may be used for this purpose.

Referring to the individual indicium as a magnetic bit, the polarity of each bit is indicated in the drawing. The code as shown indicates a binary identification number 1000-1, for example. The bits between digit 4 and digit N are not shown.

Each magnetic bit may be viewed as an individual bar magnet. The dash line simply indicates the effective boundary region for the fringe field outside the magnet. The encoding takes place in such a manner as to provide a planar magnetic indicia bit with flux lines transverse with the length of the striping. The bit produces flux lines which emanate from the pole in opposite directions out of the plane of the medium. It will be observed for example that the polarity of the second bit is reversed and the fringe fields are directed oppositely from the fields relating to the first magnetic bit.

*Operation*

Referring to FIG. 1, a data bearing medium with an identification code of linearly disposed magnetically recorded indicia is introduced to the transport means and propelled, for example, by air flow. A program for directing the media along the desired path is introduced in the programmer 22. This instruction is applied to the recognition means 21. The recognition means 21 includes a coincidence logic circuit which receives, stores and compares the information with the instruction from the programmer. The output of the recognition is applied to a control circuit 23. The control circuit may be a relay system which controls or actuates the switching means 24. The switching means by, for example, obstructing or clearing a track channel or track rail, directs a media along a desired path. In the sorter 12 the media are directed to any of a number of storage bins 25, 26, 27 or 28 or to a recycling path to go through this system again. In addition to the storage functions, the individual medium may be extracted from the system for viewing or other purposes or directed along other paths.

*Description and explanation of the circuit in FIG. 5*

Referring now to FIG. 5, there is here illustrated a schematic block diagram of a data processing circuit embodying the invention. The diagram generally includes a receiver means having a reference means for providing a preselected sequence of a predetermined number of reference pulses. A comparator is coupled to the receiver and reference pulse generator. The output of the comparator is applied through a mismatch memory circuit to a control circuit. A discrete signals counter is coupled to the output of a discrete signals sensing head and amplifier and to a control device. A photoelectric sensing means or detector circuit is coupled to the counter circuit and to the control circuit. The control circuit derives an input from the comparator, counter, and photoelectric circuits.

Referring now in detail to the drawing, discrete signals are received by a discrete signals sensing head 101 which is coupled to an amplifier 102. An input request is applied to a reference pulse generator 103. The outputs of the amplifier 102 and generator 103 are coupled to a comparator 104. An output of the amplifier 102 is coupled to a counter 105. An output of the counter 105 is coupled to a discrete signals memory 106. Another output of the counter 105 is applied to the generator 103. The output of the comparator 104 is coupled to a mismatch memory circuit 107. The memories 106 and 107 are coupled to elements of a control circuit having a coincidence gate circuit 108 and dropout gate circuit 109. A photoelectric sensing head 110 is optically coupled to a data bearing medium. The head 110 is coupled to medium presence signal amplifier 111. An output of the amplifier 111 is coupled to a reset trigger circuit 112 and another output is coupled to an interrogate trigger circuit 113. The reset circuit 112 is coupled to the counter 105, the mismatch memory 107 and the discrete signals memory 106. An output of the interrogate circuit 113 is coupled to the coincidence circuit 108 and the dropout circuit 109.

A data bearing medium of the type illustrated in FIG. 3 in the manner of the system in FIG. 1 moves past discrete signals sensing head 101. The output of the head 101 is a series of discrete signals, such as pulses of successive polarity, and is applied to the amplifier 102. An input request, for example, for selecting a desired medium, is applied to the reference pulses generator 103. The discrete signal pulses from the amplifier 102 and reference pulses from the generator 103 are compared for polarity differences in the comparator 104. In the event of a single difference, an output signal is derived from the comparator 104 and applied to the mismatch memory circuit 107.

The photoelectric sensing head 110 detects the presence of a medium, for example, by the interruption of a light beam. The output of the head 110 is amplified in the circuit 111. The leading edge of, for example, a pulse indicating the presence of the medium, is applied to the reset circuit 112 which produces a reset trigger pulse. The trigger pulse from the circuit 112 restores the counter 105 to zero and resets the generator 103 for producing a new sequence of reference pulses. The reset trigger also neutralizes the mismatch memory 107 and discrete signals memory 106. A short time later an interrogate trigger pulse from the circuit 113 enables the coincidence circuit 108 and the dropout gate circuit 109.

The discrete signal pulses are coupled from the amplifier 102 to the comparator 104 and compared there on a pulse for pulse basis with reference pulses derived from the generator 103. The coincidence circuit 108 is disabled in response to a difference signal from the mismatch memory 107. The counter 105 produces an indication of the desired count which is stored in the discrete signals memory circuit 106. When the indication of a desired number of pulses is stored in the memory 106, an enabling signal is applied to the coincidence circuit 108. The coincidence circuit is thus enabled by a signal indicating the desired number of pulses from the memory circuit 106, and an interrogate trigger from the circuit 113. The first indication of a mismatch from the memory circuit 107 disables the coincidence circuit. The output of the circuit 108 is a control signal indicating the presence of a desired medium for selection for a desired function. In the system of FIG. 1, this implies that it may be selected for retrieval from the system or placed in position for viewing or copying.

The dropout gate circuit 109 produces a control signal which extracts a medium from the system where a defect or malfunction is indicated. This indication is provided by the absence of a counter signal indicating the desired number of received discrete signal pulses.

Broadly speaking, the system operates to extract a defective or malfunctioning medium from the system, recirculate a medium as not being the desired one for selection or selects a desired medium for further operation. The coincidence circuit provides a comparison between a given medium identification code data indicia with a requested number. If the medium number is coincident with the requested number a coincidence signal is generated. As the medium passes the magnetic reading head, magnetically recorded binary indentification code indicia on the medium generate a series of positive and negative pulses in the output of the magnetic reading head. These pulses are amplified and fed into the comparator circuit. The reference pulse generator or requested number register stores the requested number in parallel form. A magnetic pulse counter cooperates with the register to feed reference pulses in serial form and in synchronism with the received discrete pulses. Any mismatch which occurs as a result of the pulse for pulse comparison is stored as a difference signal in the mismatch memory. The desired pulse sequence is stored in the discrete signal memory.

A photoelectric detector or sensing head is used to sense the presence of a medium passing the magnetic sensing head. The leading edge of the pulse from the photocell is used to generate a reset trigger pulse for resetting the counter and the memory. The trailing edge of the pulse is used to generate an interrogate pulse which enables the coincidence and dropout circuits. The dropout circuit operates in such a manner as to tend to extract a medium from the system unless it is disabled by an indication of a proper number of discrete signals plus an indication from the interrogate trigger of the presence of a medium. The coincidence circuit, on the other hand, normally produces no output unless it is enabled by the $n$th discrete signal and the interrogate trigger. In the event the circuit 108 is disabled by a signal from the mismatch circuit, no output from the coincidence circuit is possible.

In FIGS. 6, 7A and 7B, and in particular FIG. 6, there is illustrated a series of curves associated with the operation of the circuit in FIG. 7. Case I, the coincidence condition, is illustrated in 6(A). In FIG. 6(A), the curve (a) is the amplified and clipped output pulse of the amplifier 138. The pulse may have a duration typically of the order of 5 milliseconds. The curve (b) illustrates the reset trigger pulse output of the reset AND circuit 142; the curve (c) illustrates the output discrete signals of the sensing head 101; the curve (d) illustrates the output of the discrete signals $P_c$ pulses circuit 117; the curve (e), the output of the $N_c$ pulses circuit 116; the curve (f), the output counting pulses of the counter OR circuit 127; the curve (g), the output of the $n$th pulse memory circuit 134; the curve (h), the output of the reference $P_R$ pulses circuit 132; the curve (i), the $N_R$ pulses circuit 131; the curve (j), the output of the comparator inverter 120$a$; the curve (k), the output of the mismatch memory 121; the curve (l), the interrogate trigger pulse output of the interrogate inverter circuit 140$a$; the curve (m), the output of the coincidence NAND circuit 122 and the curve (n), the output of the dropout NAND circuit 135.

*Description and explanation of the circuit in FIGS. 7A and B*

Referring now to FIGURES 7A and B, there is here illustrated a detailed schematic block diagram of the data processing circuit in FIG. 5. Magnetic medium signals 114 are coupled to the magnetic discrete signals sensing head 101 as described above. The output of the head 101 is coupled to the amplifier 102. An output of the amplifier 102 is coupled to a discrete signals inverter 115 and thence to a discrete signals $N_c$ pulses circuit 116. Another output of the amplifier 102 is directly coupled to discrete signals $P_c$ pulses circuit 117. The output of the circuit 116 is directly coupled to a comparator AND circuit 118 and the output of the circuit 117 is directly coupled to a second comparator AND circuit 119. The circuits 118 and 119 are coupled to a comparator OR circuit 120 which is in turn coupled to a mismatch memory, flip-flop circuit 121. The output of the flip-flop or memory circuit is coupled to a coincidence AND circuit 122.

The counting circuit is broadly derived, in the present embodiment, from a magnetic shift register. Another pair of outputs from the circuits 116 and 117 are coupled directly to counter AND circuits 124 and 123, respectively. Still other outputs of the circuits 116 and 117 are applied to counter inverter circuits 125 and 126. The outputs of the circuits 123 and 124 are coupled to a counter OR circuit 127. The circuit 127 is coupled to a counter shift pulse driver 128 which is in turn coupled to a magnetic shift register circuit 129. A requested number register 130 is coupled to the shift register to provide a desired sequence of reference pulses. The outputs of the register 129, as shown, are numbered 1, 2, 3, and $n$. Each output is coupled to one of two reference pulses circuits 131 and 132. The circuit 131 responds only to binary "$N_R$'s" and the circuit 132 only to binary "$P_R$'s." The circuits 131 and 132 are coupled to the comparator AND circuits 118 and 119, respectively. The $n$th output of the register 129 is coupled to a counter trigger circuit 133. The output of the circuit 133 is coupled to a discrete signals memory flip-flop circuit 134. An output of the memory circuit 134 is coupled to the coincidence AND circuit 122 and another output is coupled to a dropout AND circuit 135.

A data bearing medium 136 optically coupled to a photoelectric detector 137, the output of which is coupled to a photoelectric presence pulse amplifier 138. The output of the amplifier 138 is applied to a photoelectric presence pulse shaping circuit 139. An output of the circuit 139 is directly coupled to a trigger AND circuit 140. Another output of the circuit 139 is coupled through an inverter circuit 141 to the circuit 140. Still other outputs of the circuit 139 are coupled directly to an interrogate AND circuit 142, and through an interrogate inverter circuit 143 to the circuit 142. The output of the circuit 142 is coupled to a reset pulse driver circuit 144 which is in turn coupled to the register 129. The circuit is coupled to the discrete signals memory circuit 134, and to the mismatch memory circuit 121. The interrogate circuit 140 is coupled to the dropout AND circuit 135 and the coincidence AND circuit 122.

*System logic*

In the system associated with FIGURES 7A and B and the waveforms of FIGURE 6, the received discrete signals are identified by the presence of a positive or negative voltage amplitude. Thus, the term $P_c$ represents a received discrete binary signal having a positive voltage relative to ground as measured across an input signal sensing head, the magnetic sensing head 201. The magnitude of the voltage is greater than a given threshold level. The symbol $N_c$ represents a negative received binary signal.

The received signals are compared with stored binary reference pulses to provide an indication of coincidence. The reference pulses are defined as requested numbers or reference pulses $P_R$ and $N_R$.

The operations of the related logical circuits are described by binary "1" and "0" notation. In this sense the binary "1" indicates the presence of a signal, and the binary "0," the absence of a signal. The corresponding electrical voltage levels relative to ground are zero volts for the binary "0," and a negative voltage, for example, −12 volts, for the binary "1."

A logical "AND" circuit has a plurality of input and one output terminals. Such a circuit operates to provide a binary "1" in its output if and only if binary "1's" are applied to all inputs. Thus, for two input terminals, if a binary "0" appears at either or both inputs, a binary "0" appears at the output. If and only if a binary "1" appears at both inputs, a binary "1" appears at the output.

A logical "OR" circuit for binary "1's" operates to produce a binary "1" in its output if it receives a binary "1" in either one or both of the inputs. A binary "0" is produced at the output if and only if binary "0's" appear at all of the inputs.

In logical notation the negative of an "AND" circuit is a "NAND" circuit. A "NAND" circuit for binary "1's" operates to produce in its output a binary "0" if and only if binary "1's" are applied at the input. In such a circuit the presence of a binary "0" in any or all of the inputs produces a binary "1" in the output. Noting that binary "1" or "0" indicates the presence or absence of a signal, the signal itself may be inverted. Thus, a signal represented by $P_c$ is a binary "1" and the signal represented by $\overline{P}_c$ is an inverted binary "1." A logical "NAND" circuit for binary "0's" operates to produce a binary "1" in its output if and only if binary "0's" appear at all of the inputs. If a binary "1" appears at any or all of the inputs, a binary "0" is produced at the output.

A "NOR" circuit is the negative of an "OR" circuit. A "NOR" circuit for binary "1's" operates to produce a binary "0" in the output if a binary "1" is present at any or all inputs. A binary "1" is produced at the output if and only if binary "0's" appear at all inputs. In electrical terms if negative supply voltage is applied at any or all inputs of a "NOR" circuit, the output in the preferred embodiment is 0 volt. If 0 volt are applied at all of the inputs, the output is the negative supply voltage.

The "OR" circuit and the "AND" circuit may be converted into a "NOR" and a "NAND" circuit, respectively, by serially coupling an inverter circuit to the output. The inverter inverts a binary "0" to produce a binary "1" and vice versa. In electrical terms a 0 voltage input is converted into a negative supply voltage output. Conversely, a negative supply voltage input is converted into a 0 voltage output.

The circuits to be described below involving the logical operations described above include: the comparator and coincidence circuits; the discrete signals impulse memory and dropout; and the discrete signal pulse counter. The existence of a received discrete signal and the interrogate, reset, coincidence and drop-out states are represented by a binary "1." The absence of the above mentioned signal or state is represented by a binary "0."

*Operation*

Magnetic signals 114 are coupled by the motion of a data bearing medium carrying identification code data indicia to the magnetic discrete signals sensing head 101, and the amplifier 102. The output of the amplifier 102 is directly coupled to a circuit 117 such as a Schmitt trigger circuit. Another output of the amplifier 102 is applied through a discrete signals inverter circuit 115 to the circuit 116. The original signal as shown at the input of the circuit 117 has successively a positive voltage amplitude, two negatives and a positive corresponding, for example, with the binary identification code number $N_cP_cP_cN_c$. The circuit 117 operates to produce an output of positive going pulses corresponding with the "$P_c$'s" in the original signal. The other output of the amplifier 102 is inverted to provide in the output of the circuit 116 positive going pulses corresponding with the original "$N_c$'s." Thus, the output of the circuit 116 provides binary "$N_c$'s" to the comparator AND circuit 118, and the output of the circuit 117 provides "$\overline{P}_c$'s" to the comparator AND circuit 119.

The comparator AND circuits 118 and 119 operate in such a manner as to produce no output unless a mismatch occurs between received discrete pulses and reference pulses, i.e., between the requested number and that of a given medium interrogated. If either circuits 118 and 119 produces an output indicative of a mismatch, the OR circuit 120 produces a difference signal to trigger the mismatch memory flip-flop circuit 121. A single signal is enough to trigger the mismatch memory circuit 121 and maintain an output mismatch or difference signal until the circuit is reset. The mismatch signal disables the coincidence AND circuit 122, i.e., prevents it from producing a coincidence signal in its output.

The comparator AND circuit 118 produces an output signal in response to received "$N_c$'s" and reference "$P_R$'s." The circuit 119 responds to received "$P_c$'s" and reference "$N_R$'s." In the event of a mismatch one of the circuits produces an output mismatch or difference signal. The mismatch signal is coupled through the OR circuit 120 to the mismatch memory 121.

The shift register and counter circuits operate cooperatively in such a manner as to produce both reference pulses and an indication of the count or number of discrete pulses. The AND circuit 118 derives input reference "$P_R$'s" from the shift "$P_R$" reference pulses circuit 132; the circuit 119 derives input reference "$N_R$'s" from the reference "$N_R$" circuit 131.

An output of the comparator circuit 116 is coupled directly to a NAND circuit 124 and through inverter circuit 126 to the circuit 124. Similarly, an output of the signals circuit 117 is coupled directly to a NAND circuit 123 and through an inverter 125 to the circuit 123. Since there is a time delay through the inverter, the AND circuit produces an output trigger having a pulse width equal to the time delay through the inverter.

These pulses in the output of the circuits 123 and 124 are coupled to the NOR circuit 127. The circuit 127 produces in its output a series of counting pulses which are all positive going. The counting pulses are applied to the counter shift pulse driver circuit 128, which produces amplified pulses which are applied to the magnetic shift register 129. The magnetic shift register, as will be described in greater detail below, operates in such a manner as to produce a first output in the #1 output channel which then shifts to produce an output for the #2 channel, etc., through the $n$th channel. The shift register circuit is always set up so that it produces a negative amplitude pulse in its output shifted in time relative to the previous pulse. The requested number, as indicated here, $N_R P_R P_R N_R$, is obtained by setting the requested number register to switch the inputs of one or the other of the reference circuits 132 and 131, which produces the corresponding "$P_R$'s" or "$N_R$'s" in the output.

The output of the circuit 131 corresponds with the "$P_c$'s" in the original signal and the output of the 132 corresponds with "$N_c$'s." Thus, the requested number is obtained by switching the output of the magnetic shift register to the proper trigger 131 or 132. The "$\bar{P}_R$'s" from the circuit 132 are compared with the "$\bar{N}_c$'s" from the circuit 116 at the comparator AND circuit 118. The "$N_R$'s" from the trigger circuit 131 are compared with the "$P_c$'s" from the comparator circuit 117 at the AND circuit 119. As noted above, a difference or mismatch between the received discrete signals and the requested number reference pulses cause the OR circuit 120 to produce in its output a signal indicative of the mismatch. This signal is applied to the mismatch memory 121 which produces a disabling signal for coincidence AND circuit 122.

The photoelectric detector 137 senses the presence of the data bearing medium 136 and produces a voltage output which is coupled to the amplifier 138. The output of the amplifier 138 is applied to the photoelectric shaping circuit 139 which produces in its output a negative going square wave pulse. The negative pulse and an inverted delayed pulse from inverter 141 are compared at the interrogate AND circuit 140 to provide an output interrogate trigger pulse having the width of the time delay provided by the inverter circuit 141.

The reset trigger pulse is amplified at the driver circuit 144 and applied to the magnetic shift register to restore the count to zero. The reset pulse is also applied to the discrete signal pulse memory 121 to clear it for the new indication of a desired signal count. The reset trigger is also coupled to the mismatch memory circuit 121 to clear it.

The positive-going pulse output of the trigger circuit 139 is coupled directly to the reset AND circuit 142 and through the reset inverter circuit 143 to the circuit 142. The circuit 142 produces in its output a delayed reset pulse corresponding with the leading edge of the output pulse from the trigger circuit 139, as opposed to the output of the interrogate trigger circuit 140, which corresponds with the trailing edge. The interrogate pulse enables the coincidence AND circuit 122 and the dropout AND circuit 135. The requested number is obtained by switching the output of the magnetic shift register as indicated above, to correspond with the number of a desired data bearing medium. The $n$th pulse output of the register 129 produces in the output of the $n$th signal pulse circuit 133 a pulse to trigger the $n$th signal pulse memory circuit 134. The positive-going output of the circuit 134 is applied to enable the coincidence AND circuit 122, as noted above, and the negative output is applied to disable the dropout AND circuit 135.

Figure 8:
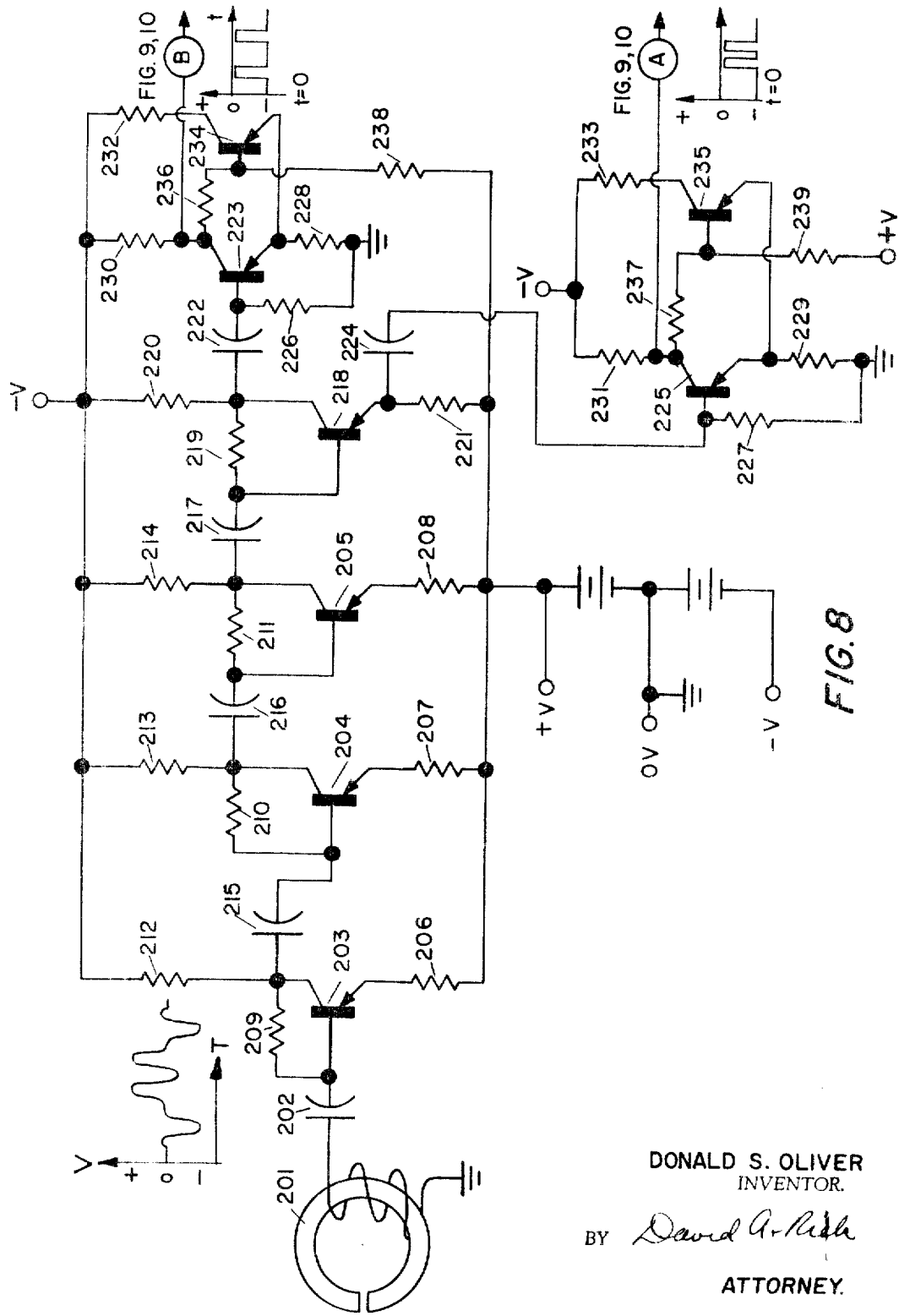
FIG. 8 is a detailed, schematic circuit diagram of the discrete signals sensing and pulses circuit in FIG. 7A.

*Description and explanation of the trigger circuit of the discrete signal and amplifier circuits in FIG. 8*

Referring now to FIG. 8, there is here illustrated a detailed schematic circuit diagram of the sensing head, the amplifier circuit, the inverter circuit and the triggers corresponding with the input trigger circuit in FIG. 7. Here a magnetic sensing head is coupled through a capacitor to a three-stage transistor amplifier circuit providing a gain of approximately 40 to 45 db. The output of the amplifier is coupled through a single stage transistor inverter circuit to a dual transistor monostable trigger circuit.

Thus the winding of a magnetic sensing head 201 is coupled through a capacitor 202 to the base of the first amplifier stage transistor 203. The other two stages are associated with transistors 204 and 205. Thus, PNP type transistors 203, 204 and 205 have their emitter connected to bias resistors 206, 207 and 208 respectively. The other end of the resistors are connected together to the positive side of a power supply, for example, a twelve volt supply.

Resistors 209, 210 and 211 are connected between the bases and collectors of transistors 203, 204 and 205, respectively. The transistor collectors are connected together to the negative supply. The power supply may consist of a center tap grounded direct current battery supply with positive and negative terminals. In the preferred embodiment, two twelve volt batteries connected in series with their common terminals junction grounded provide an adequate source of supply. The collectors of each of the transistors 203, 204 and 205 are coupled through capacitors 215, 216 and 217, respectively, to the base of the next succeeding transistor. The capacitor 217 is coupled to the base of a transistor 218 connected in an inverter circuit. A resistor 219 is connected between the collector and base of the transistor 218. The collector is connected through a load resistor 220 to the negative supply. The emitter is connected through a load resistor 221 to the positive supply. The collector is coupled through a capacitor 222 to the base of a transistor 223. The transistor 234 and the transistor 223 are connected in a monostable trigger circuit. The emitter of the transistor 218 is coupled through a capacitor 224 to the base of a transistor 225. A transistor 235 and the transistor 225 are connected in a monostable trigger circuit.

The bases of the transistors 223 and 225 are connected through resistors 226 and 227 to ground. The emitters are connected through bias resistors 228 and 229 to ground. The collectors are connected through load resistors 230 and 231 to the negative supply. The collectors of transistors 223 and 231 are also connected to output terminals marked B and A, respectively. The collectors are connected through resistors 236 and 237 to the bases of the complementing transistors 234 and 235, respectively. The collectors of the transistors 234 and 235 are connected through resistors 232 and 233 to the negative supply. The emitters of the transistors 234 and 235 are connected to the emitters of the transistors 223 and 235, respectively. The resistors 236 and 237 are connected in series with resistors 238 and 239, respectively, to the positive side of the supply.

The trigger circuit including the transistors 223 and 234 corresponds with the comparator monostable trigger circuit 116 in FIG. 7. The circuit including transistors 225 and 235 corresponds with the circuit 117 in FIG. 7.

*Operation*

The output of the sensing head 201 is coupled through the capacitor 202 to the base of the transistor 203. The transistors 203, 204 and 205 are connected in a three-stage amplifier circuit to provide, e.g., of the order of 40 to 45 db. gain. The amplified output of the transistor 205 is applied to the inverter circuit associated with the transistor 218. The inverter is coupled to a pair of comparator monostable trigger circuits corresponding to the circuits 116 and 117 in FIG. 7. One trigger circuit provides only discrete binary "$N_c$'s" for coupling to the comparator, mismatch and coincidence circuits; the other provides only "$P_c$'s."

A received, amplified signal pulse applied to the base of the inverter transistor 218 provides an output of one polarity across the collector load resistor 220. The collector is coupled through the capacitor 222 to the base of the transistor trigger circuit 223. A pulse of the opposite polarity is developed across the load resistor 221 and is coupled through the capacitor 224 to the base of the transistor 225.

The transistor 234 of the trigger circuit is normally conducting through one resistor 228 to produce a negative voltage at the emitter of the transistor 223. The base of the transistor 223 is thus positive relative to the emitter and maintains the transistor 223 cut off. The bias voltage developed between the base and emitter of the transistor 223 may, for example, be the order of one volt. Positive pulses appearing at the base of the transistor 223 have no effect on the circuit. A negative pulse however, in excess of one volt, drives the base of the transistor 223 negative relative to its emitter and causes the transistor to conduct heavily. The collector of 223 is normally at negative supply voltage, e.g., −12 volts. When transistor 223 is turned on, the voltage at its collector goes in a positive direction toward 0. A positive voltage is developed across the resistor 236 at the base of the transistor 234 to cut it off. This produces a positive-going pulse appearing in the output of transistor 223. When a negative pulse at the base of the transistor 223 passes, the base goes positive tending to cut off the transistor 223, restore its collector to negative supply voltage and enable the transistor 234 to conduct. The conduction current through the transistor 234 maintains the transistor 223 cut off until the next pulse of sufficient amplitude appears at its base.

It follows that the circuit operates to ignore all but the signals exceeding the input threshold bias voltage. This tends to insure true signal operation and filter out other voltage variations.

The monostable trigger circuit for supplying binary "$P_c$'s" is a circuit which is complementary in operation to the circuits described. This circuit is associated with the transistors 225 and 235. Here, the transistor 225 is normally maintained at cut off by virtue of the current drawn by the transistor 235 through the resistor 229. The transistor 235 is normally maintained at a negative bias voltage relative to its emitter to maintain it in conduction. The trigger circuit again operates in such a manner as to ignore positive pulses at the base of the transistor 225 and responds only to negative pulses. The negative pulse on the base of the transistor 225 which exceeds the bias voltage between the base and emitter, causes it to conduct heavily and cut off the transistor 235 in the same manner as described above with regard to the transistors 223 and 234.

It follows that one of the trigger circuits produces an output signal pulse for each input pulse of a given polarity. Because of the inverson, the 223, 234 circuit provides only binary signals corresponding, e.g., to original "$N_c$'s." The 225, 235 circuit provides only binary signals corresponding, e.g., to original "$P_c$'s."

Figure 9:
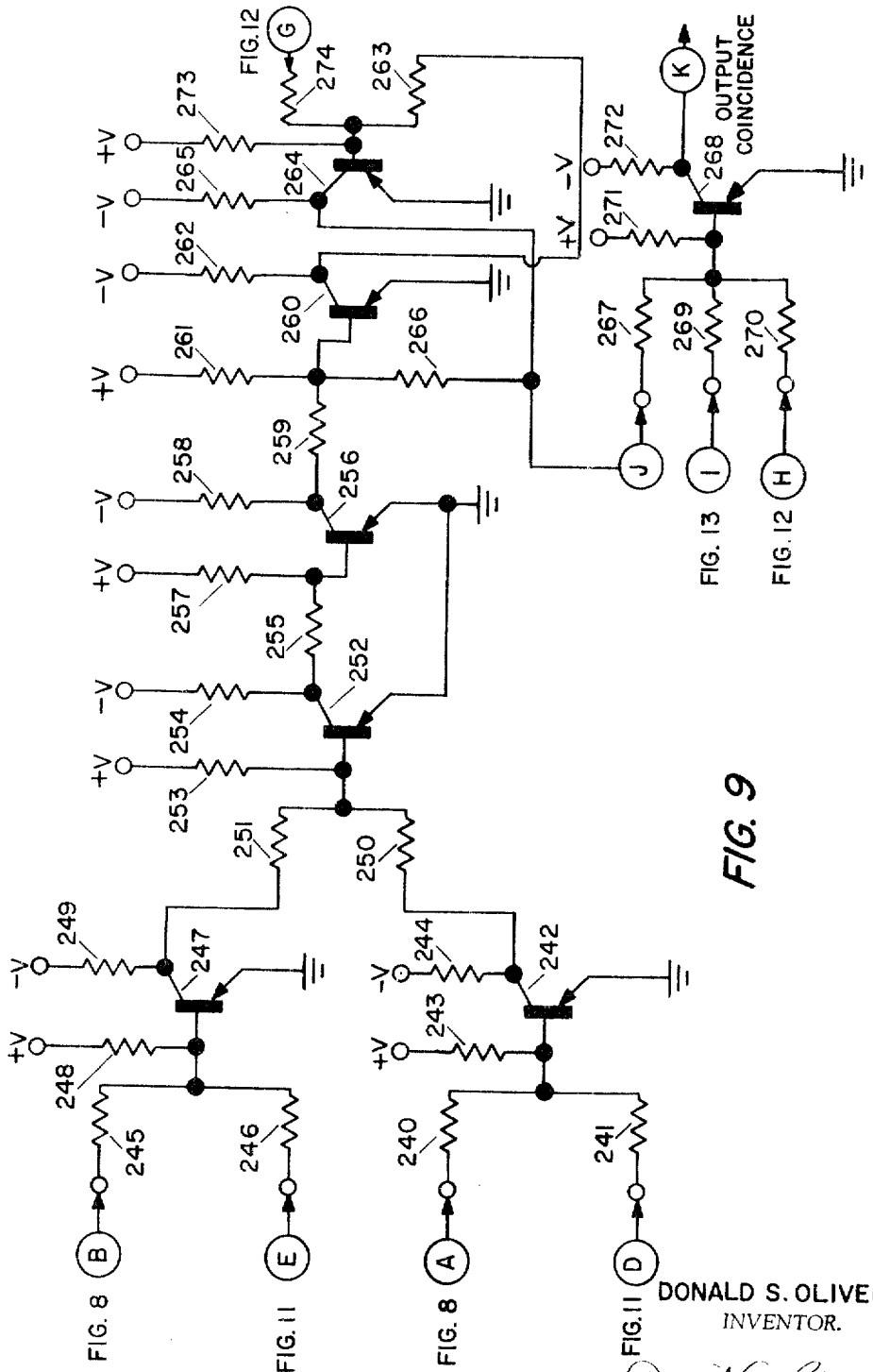
FIG. 9 is a detailed, schematic circuit diagram of the comparator, mismatch memory and coincidence circuits in FIG. 7A.

*Description and explanation of the mismatch, comparator and coincidence circuits in FIG. 9*

Referring now to FIGURE 9, there is here illustrated the detailed schematic circuit diagram of the Mismatch Comparator and Coincidence circuits outlined in FIG. 7. The AND circuits associated with a pair of transistors 242 and 247 correspond with the circuits 119 and 118, respectively, in FIG. 7. The OR circuit 120 in FIG. 7 corresponds with the circuit of transistors 252 and 256; the mismatch memory 121 corresponds with the circuits of a pair of transistors 260 and 264. The coincidence AND circuit 122 corresponds with the circuit formed with a transistor 268. A pair of resistors 240 and 241 are connected in common to the base of the transistor 242. The base is also connected through a resistor 243 to the positive supply. The emitter of the transistor 242 is grounded and the collector is connected through a load resistor 244 to the negative supply. A pair of resistors 245 and 246 are connected in common to the base of transistor 247. In a manner similar to the circuit above, the base of the transistor 247 is connected through a resistor 248 to the positive supply, and the collector is connected through a resistor 249 to the negative supply. The emitter is grounded. The collectors are coupled through resistors 250 and 251 to the base of transistor 252.

The base of the transistor 252 is connected through a resistor 253 to the positive supply; the collector is connected through a resistor 254 to the negative supply, and the emitter is grounded. The collector is coupled through a resistor 255 to the base of a transistor 256.

The base of the transistor 256 is connected through a resistor 257 to the positive supply, the collector through a resistor 258 to the negative supply and the emitter is grounded. The collector is coupled through a resistor 259 to the base of transistor 260. The base of the transistor 260 is coupled through a resistor 261 to the positive supply, the collector is connected through a resistor 262 to the negative supply, and the emitter is grounded. The collector of 260 is also coupled through a resistor 263 to the base of a transistor 264. The transistors 260 and 264 and their associated circuitry comprise a bistable "flip-flop" circuit.

The collector of the transistor 264 is connected through a resistor 265 to the negative power. The collector is also connected through a resistor 266 to the base of the transistor 260. The junction between the collector of the transistor 264 and the resistor 266 is connected through a resistor 267 to the base of a grounded emitter connected transistor 268. The resistors 269 and 270 are connected together in common with the resistor 267 to the base of the transistor 268. The base of the transistor 268 is connected through the resistor 271 to the positive battery terminal. The collector of the transistor 268 is connected through a resistor 272 to negative power and the emitter is grounded. The collector of the transistor 268 is connected to a terminal K which carries the coincidence AND circuit output signal. The base of the transistor 264 is also connected through a resistor 273 to positive power and a resistor 274 to a terminal marked G.

The signal inputs derived at the terminals A, B, D, E, G, H, and I may be determined from the detailed schematic block diagram of FIG. 7. More particularly, the inputs to terminals A and B are derived from terminals A and B of FIG. 8; terminals D and E from FIG. 11; terminals G and H from FIG. 12; and terminal I from FIG. 13.

The voltages at terminals A, B, D, and E are normally −12 volts to apply a negative bias to the transistors 242 and 249 to cause these transistors normally to conduct. With these transistors normally conducting, a positive voltage is developed at the base of the transistor 252 across the resistors 250 and 251. The transistors 252 is normally cut off. Its collector negative voltage is coupled to the base of the transistor 256 to render it conductive. Its collector positive-going voltage is coupled to the base of the transistor 260 normally to cut it off. The negative voltage at the collector of 260 is coupled to the base of the transistor 264 to cause it to conduct. The positive voltage developed at its collector is coupled through the resistor 266 to the base of the transistor 260 to hold that transistor cut off.

Terminal H is at negative supply voltage for a no presence signal condition. The base of transistor 268 is negative, and the transistor conducting; the voltage at the terminal K is 0. The voltage at K remains 0 unless all three input voltages at H, I and J are simultaneously 0.

Operation

As noted above in regard to FIG. 7, a logical AND circuit requires two binary "0's" at the input to produce a binary "1" in the output. At the terminal pairs A and D or B and E, this implies zero volts input at both terminals of either pair. The binary "0" then corresponds with the 0 or ground supply voltage. Given a binary "0," applied to at least one terminal of each pair, no signal output is produced. A logical OR circuit produces an output signal if there exists a "0" at either or both inputs. Thus, if a mismatch occurs between received signals pulses and reference pulses, a pair of binary "0's" appear at either the terminal pair A and D or the terminal pair B and E. Looking at the other end of the system, the coincidence AND circuit provides an output binary "1" only when there are binary "0's" applied to all three input terminals H, I and J. In this circuit the binary "1" is equivalent to the negative supply voltage.

If any one of the terminals J, I, or H has a binary "0" or negative supply voltage at the input, there is no coincidence signal output. The terminal J derives its input from the mismatch memory circuit. As noted above, the mismatch memory circuit normally operates with the transistor 260 cut off and the transistor 264 conducting heavily. The voltage of the collector of the transistor 264 is normally positive-going or 0. This positive voltage is coupled through the resistor 266 to the base of the transistor 260 to maintain that transistor cut off. When a negative voltage appears at the base of the transistor 260 indicating the presence of a single difference or mismatch signal, the transistor 260 conducts into saturation. The voltage at the collector of the transistor 260 becomes zero which causes a positive voltage across the resistor 263 to appear at the base of the transistor 264. This positive voltage at the base of the transistor 264 causes it to be cut off and produces a negative supply voltage at the collector. The negative voltage at the collector of 264 is coupled through the resistor 266 to the base of the transistor 260 to maintain that transistor in saturation. It will thus be apparent that the mismatch memory circuit is a bistable stage device of flip-flop circuit which normally carries one voltage output or the other.

In the event of no mismatch there is no output signal from the mismatch memory. In the event of a mismatch, the output signal from the mismatch memory circuit is a binary "1," applying −12 volts through the resistor 267 to apply a negative voltage on the base of the transistor 268 and produce a non-coincidence signal in its output or a positive-going voltage. For the condition of the mismatch then, a pair of "0's" must appear either at the terminals A and D or the terminals B and E. Such a mismatch is produced on the basis of a pulse-for-pulse comparison. The first difference or mismatch signal appears as a pair of zero volt signals either on A and D or B and E. For a signal pair at A and D, a positive voltage is developed across the resistors 240 and 241.

The transistor 242 is then cut off producing a negative supply voltage at its collector which is coupled through the resistor 250 to the base of the transistor 252. Unless a dropout occurs at the time that two "0's" appear at the terminals B and E, a pair of zeros appear at the terminals A and D. This implies a negative supply voltage on the resistors 245 and 246 which causes the transistor 247 to conduct heavily and produce a 0 voltage or binary "0" at the collector.

The OR circuit, however, responds to a signal that is a binary "1" from either output of either circuit. This implies a negative voltage on the base of the transistor 252 to cause it to conduct heavily and produce a zero at its collector. A positive voltage is developed across the resistor 255 which applies a positive voltage to the base of the transistor 256 to cut it off and produce a negative voltage at the collector. The negative voltage at the collector is coupled through he resistor 259 to the base of the transistor 260 to cause it to conduct strongly. This triggers the mismatch memory circuit to provide a negative voltage at the output of the transistor 264 which is the equivalent of a binary "1."

Figure 10:
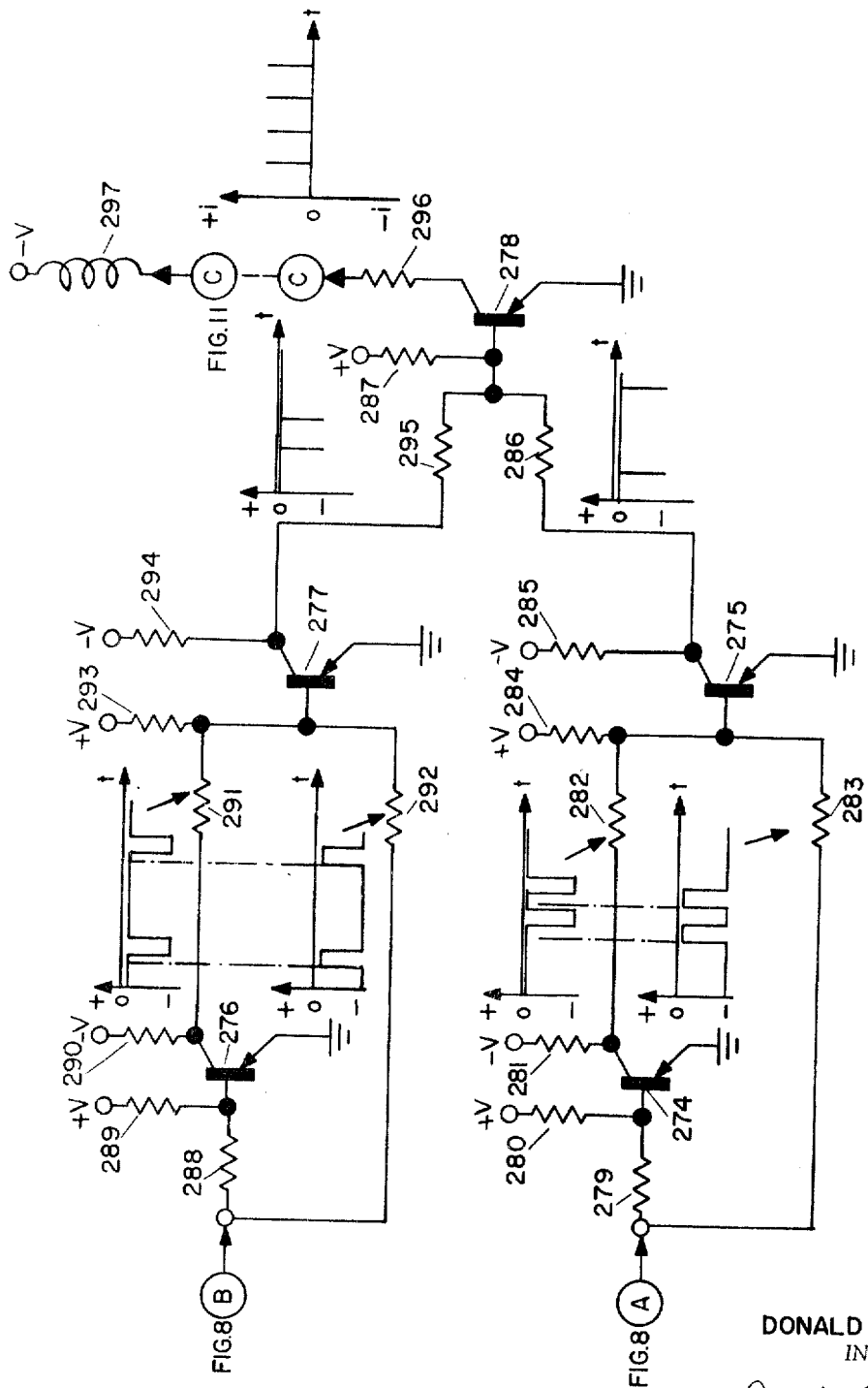
FIG. 10 is a detailed, schematic, circuit diagram of the counter synchronizing trigger pulses circuit in FIG. 7A.

Description and explanation of the counter trigger circuit in FIG. 10

In FIG. 10, there is illustrated the leading edge Counter Trigger Circuit outlined in FIG. 7. FIG. 10 corresponds with the Counter Inverter and AND circuits 123, 124, 125, 126 and the OR circuit 127 in FIG. 7. In FIG. 10, transistors 274 and 276 correspond with inverters 125 and 236, respectively, in FIG. 7; transistors 275 and 277 with the AND circuits 123 and 124, respectively; and transistor 278 with the OR circuit 127. The terminals A and B derive an input from the comparator monostable trigger circuits 117 and 116, respectively, in FIGS. 7 and 8.

Input terminal A is coupled through a resistor 279 to the base of the transistor 274. The base is also coupled through a resistor 280 to positive supply voltage. The collector is coupled through a resistor 281 to negative supply voltage and through resistor 282 to the base of the transistor 275. Terminal A is also coupled directly through a resistor 283 to the base of the transistor 275. The base of 275 is coupled through a resistor 284 to the positive supply voltage and its collector is coupled through a resistor 285 to the negative supply voltage.

The output of the AND circuit associated with the transistor 275 is coupled to the OR circuit through a resistor 286 to the base of the transistor 278. The base of the transistor 278 is coupled through a resistor 287 to the positive supply voltage.

The input terminal B is coupled through a resistor 288 to the base of the transistor 276. As shown in the drawings, the emitters of the transistors 274, 275, 276, 277 and 278 are all grounded. The base of the transistor 276 is coupled through a resistor 289 to positive supply voltage and its collector is coupled through a resistor 290 to the negative supply voltage.

The collector of the transistor 276 is coupled through a resistor 291 to the base of the AND circuit transistor 277. The input terminal B is also coupled directly through the resistor 292 to the base of the transistor 277. The base is coupled through the resistor 293 to the positive supply voltage and its collector is coupled through a resistor 294 to the negative supply voltage. The collector is coupled through a resistor 295 to the base of the OR circuit transistor 278. The base of the transistor 278 is coupled through a load resistor 296 and through the terminal C to the input current winding 297 for the shift pulse driver circuit in FIG. 11.

Operation

The counter shift circuit operates to convert the signal pulses into a series of counter triggers. The output counter triggers are only cognizant of the number of pulses not their quality. Thus, the overall function of this circuit is to count all of the received signals pulses regardless of binary quality, i.e., binary "1's" ("$P_c$'s") or binary "0's" ("$N_c$'s").

The binary "1's" are received at the input terminal A and inverted by the circuit associated with the transistor 275 to appear at the base of the AND circuit associated with the transistor 275. Another input of the AND circuit is derived directly from the terminal A with uninverted pulses. The time delay through the inverter circuit is sufficient to produce an output trigger at the collector of the transistor 275 having a pulse width approximately equal to the time delay through the inverter circuit associated with the transistor 274. The time of occurrence of these pulses substantially corresponds with the leading edge of the input pulses at the terminal A.

In a similar manner, the binary "0" signal pulses received at the input terminal B are coupled directly through the resistor 292 to the AND circuit associated with the transistor 277. These pulses are also coupled through the inverter circuit associated with transistor 276 and applied to the base of the transistor 277 through the resistor 291. The output of the transistor 277 is again a series of pulses having a pulse width approximately equal to the time delay through the inverter circuit associated with the transistor 276 and corresponding in time substantially with the leading edge of the input pulses at the terminal B. The counter triggers are coupled through the resistors 286 and 295 to the base of the OR circuit transistor 278. The output of the OR circuit is a series of pulses corresponding with the leading edges of the received discrete signal pulses.

Specifically, the voltage at the terminal A is normally the negative supply voltage. This produces a negative voltage at the base of the transistor 274 causing it to conduct continuously. When the positive-going signal pulse input at the terminal is applied at the terminal A, the voltage at the base of the transistor 274 goes positive, as developed across the resistor 279. The collector achieves the negative supply voltage which is coupled through the resistor 282 to the base of the transistor 275. This produces a negative voltage developed across the resistor 282 which causes the transistor 275 to conduct heavily and sends its collected to approximately zero.

The original positive-going pulse on terminal A is applied directly via the resistor 283 to cut off the transistor 275; its collector then goes negative. The inverter delayed pulse, after the inverter time delay, applies the negative voltage to force the transistor 275 into conduction; the collector then goes to zero and remains there until the next pulse. Other than during the delay in time between pulses, a single negative voltage input is controlling. In this manner a series of binary "1's" are developed. In a similar manner, a series of binary "1's" are applied through the terminal B to the OR circuit transistor 278.

The voltage at this terminal is always negative when no input pulse is applied. This holds the transistors 274 and 276 conducting and holds the voltage of the collectors at zero under normal no-signal condition. The normally negative voltage is directly coupled to the bases of transistors 275 and 277 to maintain them conducting. The positive going collectors are coupled through resistors 286 and 295 to maintain transistor 278 normally cut off.

The base of the transistor 278, however, goes negative whenever a negative pulse appears across one of the resistors 286 or 295 to produce a current pulse in the output which is coupled to the input current winding of the shift pulse driver. The operation of the shift pulse driver will be described with reference to the description of FIG. 11 below.

Figure 11:
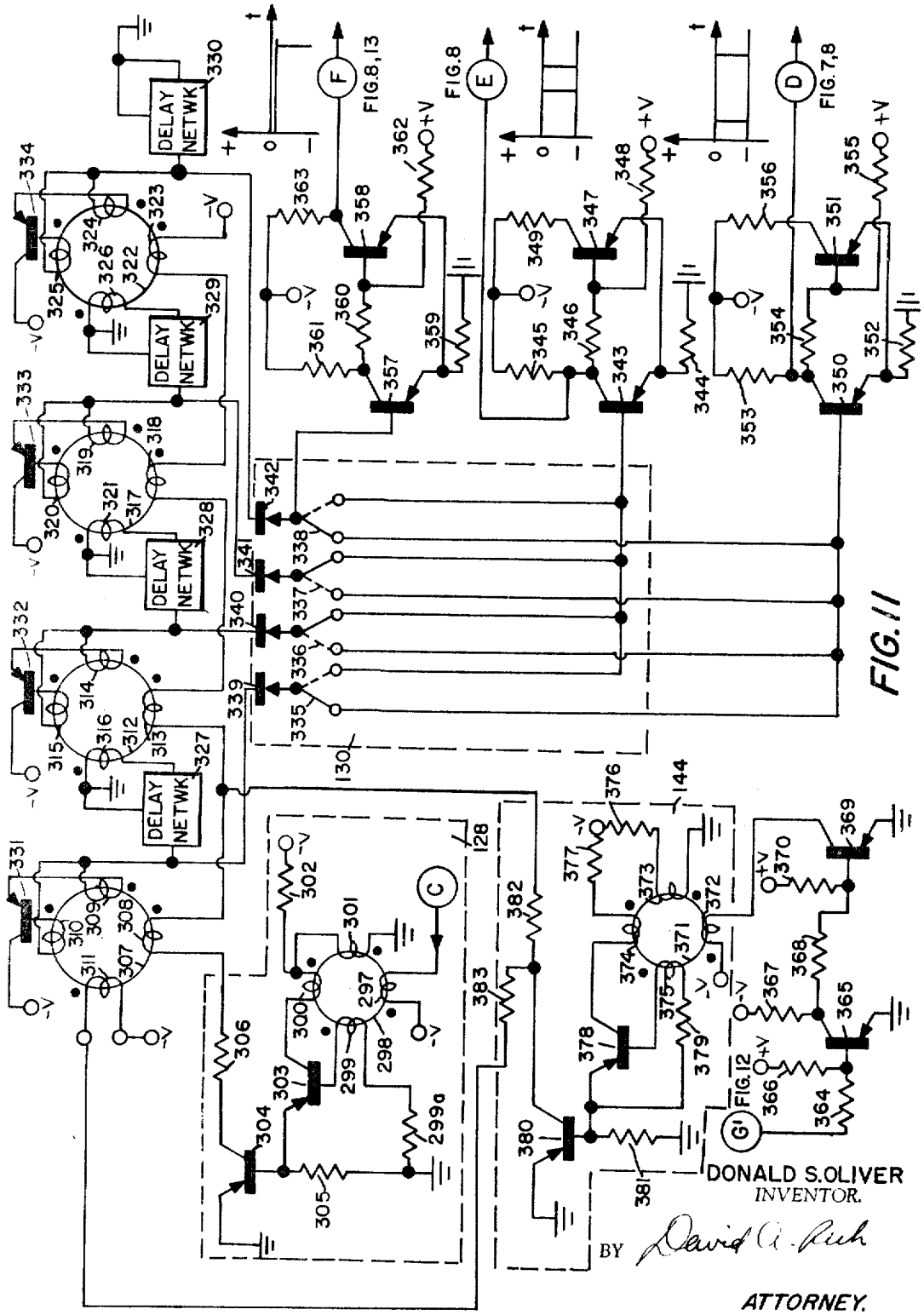
FIG. 11 is a detailed, schematic, circuit diagram of the shift and requested number registers and reference pulses circuits in FIG. 7B.

*Description and operation of the shift register circuit in FIG. 11*

In FIG. 11, there is illustrated a detailed schematic circuit diagram of the magnetic shift register and associated driver reset and output trigger circuit.

The magnetic shift register consists of a group of memory cores connected in cascade and reset in such a manner as to store a binary "1" signal or condition for only one of the cores, while the others indicate a binary "0." The shift pulse driver operates in such a manner as to shift the binary "1" condition to the binary "0" condition and not reversibly. A shift pulse driver circuit is coupled to the magnetic register circuit as noted above. The driver circuit is coupled to all of the shift windings of the memory core elements of the register. The outputs of the cores of the magnetic shift register are coupled through a switching system. The switching system couples the output of the shift register to one of two reference monostable trigger pulse circuits which produce reference binary "0's" ("$P_R$'s") or reference binary "1's" ("$N_R$'s") as reference pulses for comparison with incoming received signal pulses. In addition, the $n$th core output is coupled through the $n$th switch directly to an $n$th pulse or discrete signals memory trigger circuit.

The shift pulse driver derives an input at terminal C from the output of the OR circuits as shown in FIGS. 7 and 10. The terminal C is coupled to the winding 297 on a shift pulse driver core 298. Additional windings 299, 300 and 301 are disposed about the core 298 as shown. The winding 301 is connected through a resistor 302 to the negative supply voltage. The other end of the winding 301 is grounded. One end of the winding 300 is connected to the junction between the winding 301 and the resistor 302. The other end is connected to the collector of a transistor 303. The base of the transistor 303 is connected to an end of the winding 299. The other end of the winding 299 is connected through a resistor 299a to ground. The emitter of the transistor 303 is connected to the base of a transistor 304 and through a resistor 305 to ground. The emitter of the transistor 304 is grounded and its collector is connected through a resistor 306 to a winding 308 on a core 307 in the magnetic shift register.

As noted above, the magnetic shift register includes a number of memory cores with the shift windings connected in series. The other three windings of the first memory core element are 309, 310 and 311. The shift winding 308 is connected in series with a shift winding 313 around the core 312 of the second shift register element. The remaining windings of the second element are 314, 315 and 316. While there are four indicated cores, in fact there may be $n$ such core elements for an $n$ digit binary system. The winding 313 is similarly connected to the shift winding 318, of the third core 317. The remaining windings of the third core are 319, 320 and 321. The winding 318 is connected in series with the shift winding 323 of the $n$th core 322, the remaining windings being 324, 325 and 326.

The reset winding 311 is connected in series between the negative supply voltage and a resistor 383 in the output of the reset pulse driver circuit 144. The windings 309, 314, 319 and 324 each have an end coupled to a delay network 327, 328, 329 and 330, respectively. The other ends of the winding 309, 314, 319, and 324 are each coupled to the emitter of transistor 331–334, respectively.

The delay networks 327, 328, 329 and 330 each are connected to an end of the windings 310, 315, 320 and 325, respectively. The other ends of the windings 310, 315, 320 and 325 are connected to the bases of the transistors 331–334, respectively. The collectors of the transistors 331–334 are connected to the negative supply voltage. The output of the delay network 327, 328 and 329 are connected to an end of the windings 316, 321 and 326. The other ends of the windings 316, 321 and 325 are grounded as is an output of the delay networks. The windings 309, 314, 319 and 324 each are connected to switch elements 335–338 of the requested number register 130. The requested number register corresponds to the requested number register illustrated in FIG. 7. The shift pulse driver 128 and the reset pulse driver 144 in FIG. 11 correspond with the circuits 128 and 144 in FIG. 7. The requested number register switch elements are connected in a series with diodes 339–342, respectively.

The outputs of the switches are coupled to trigger circuits associated with transistors 343, 350 and 357. The switches are all single pole double throw and each of them has a circuit connected in parallel with the base of a transistor 343 connected in a binary "$P_R$'s" reference pulse generator circuit corresponding with the reference monostable trigger circuit 131 in FIG. 7.

The emitter of the transistor 343 is connected through a bias resistor 344 to ground. The collector is connected through a load resistor 345 to the negative supply voltage. The collector also provides an output to the terminal E for use as shown in FIG. 7 and FIG. 8 for the comparator AND circuit. The collector is also coupled through a voltage dropping resistor 346 to the base of a transistor 347. The resistor 346 is connected in series with a resistor 348 to the positive supply voltage. The emitters 343 and 347 are connected together in series with a bias resistor 344 to ground in similar manner to the monostable trigger circuits described above. The collector of the transistor 347 is connected through a load resistor 349 to the negative supply voltage.

The other switch circuits are connected to the reference binary "0's" pulses monostable trigger circuit. The binary "0's" are applied in common to the base of the transistor 350. The emitter of the transistor 350 is connected to the emitter of the transistor 351 and in series with a bias resistor 352 to ground. The collector is connected through a load resistor 353 to negative supply voltage and to terminal D output which is coupled to the comparator AND circuit as shown in FIGS. 7 and 8. The collector of the transistor 350 is coupled through a dropping resistor 354 to the base of the transistor 351. The resistor 354 is connected in series with the resistor 355 to the positive supply voltage. The collector of the transistor 351 is connected through a load resistor 356 to the negative supply voltage.

Figure 13:
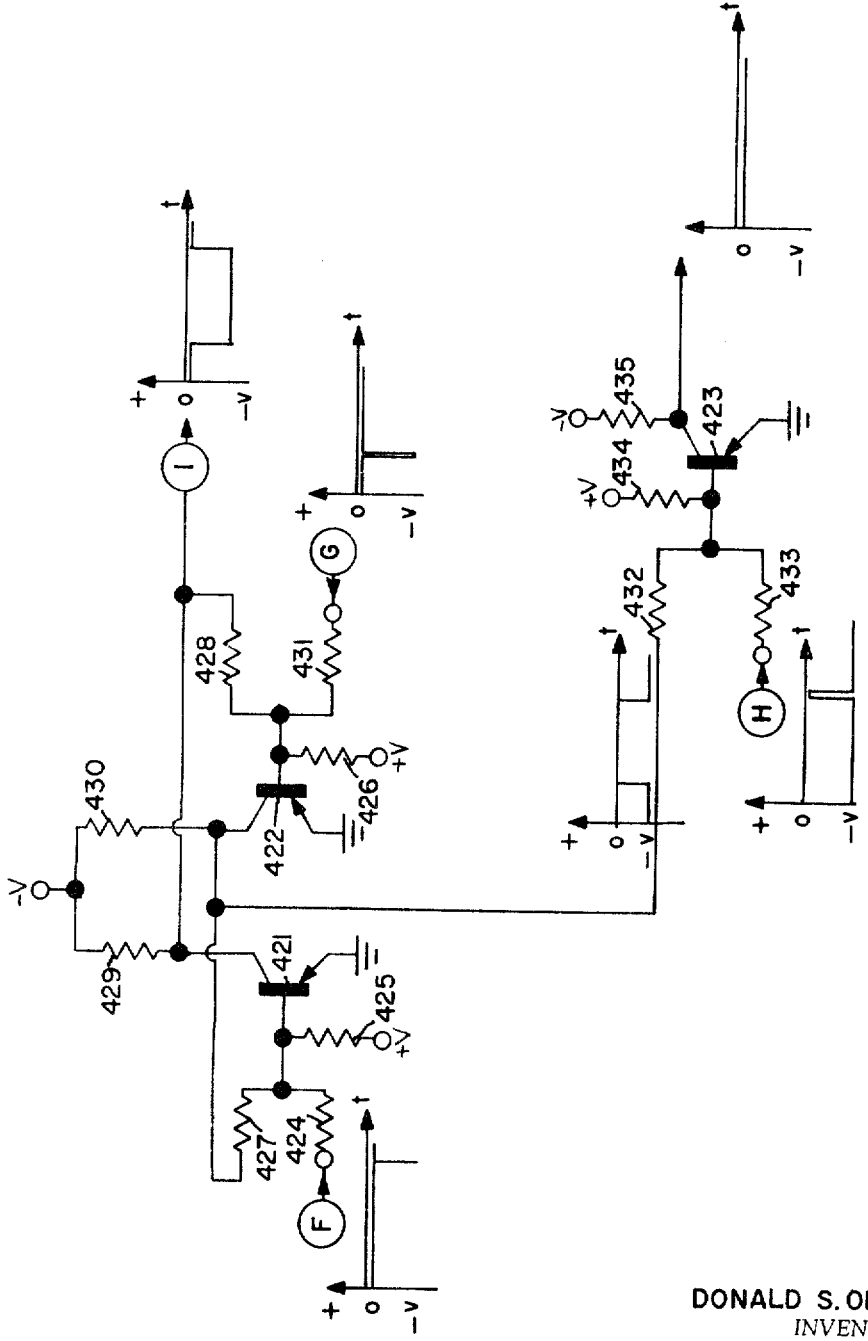
FIG. 13 is a detailed, schematic, circuit diagram of the discrete signals memory and dropout circuits of FIG. 7A.

The output of the $n$th switch element 338 is also directly coupled to the $n$th pulse or discrete signals monostable trigger circuit associated with the transistors 357 and 358. The movable pole of the switch 338 is directly connected to the base of the transistor 357. The emitters of the transistors 357 and 358 are connected together in series with a bias resistor 359 to ground. The collector of the transistor 357 is coupled through a resistor 360 to the base of transistor 358. The collector circuit of transistor 357 is connected in series with the load resistor 361 to the negative supply voltage. The resistor 360 is connected in series with a dropping resistor 362 to the positive supply voltage. The collector of transistor 358 is connected through a load resistor 363 to the negative supply voltage. The collector of the transistor 358 is coupled to terminal F which is in turn coupled to the $n$th pulse or discrete signals memory circuit as shown in FIGS. 7 and 13.

Figure 12:
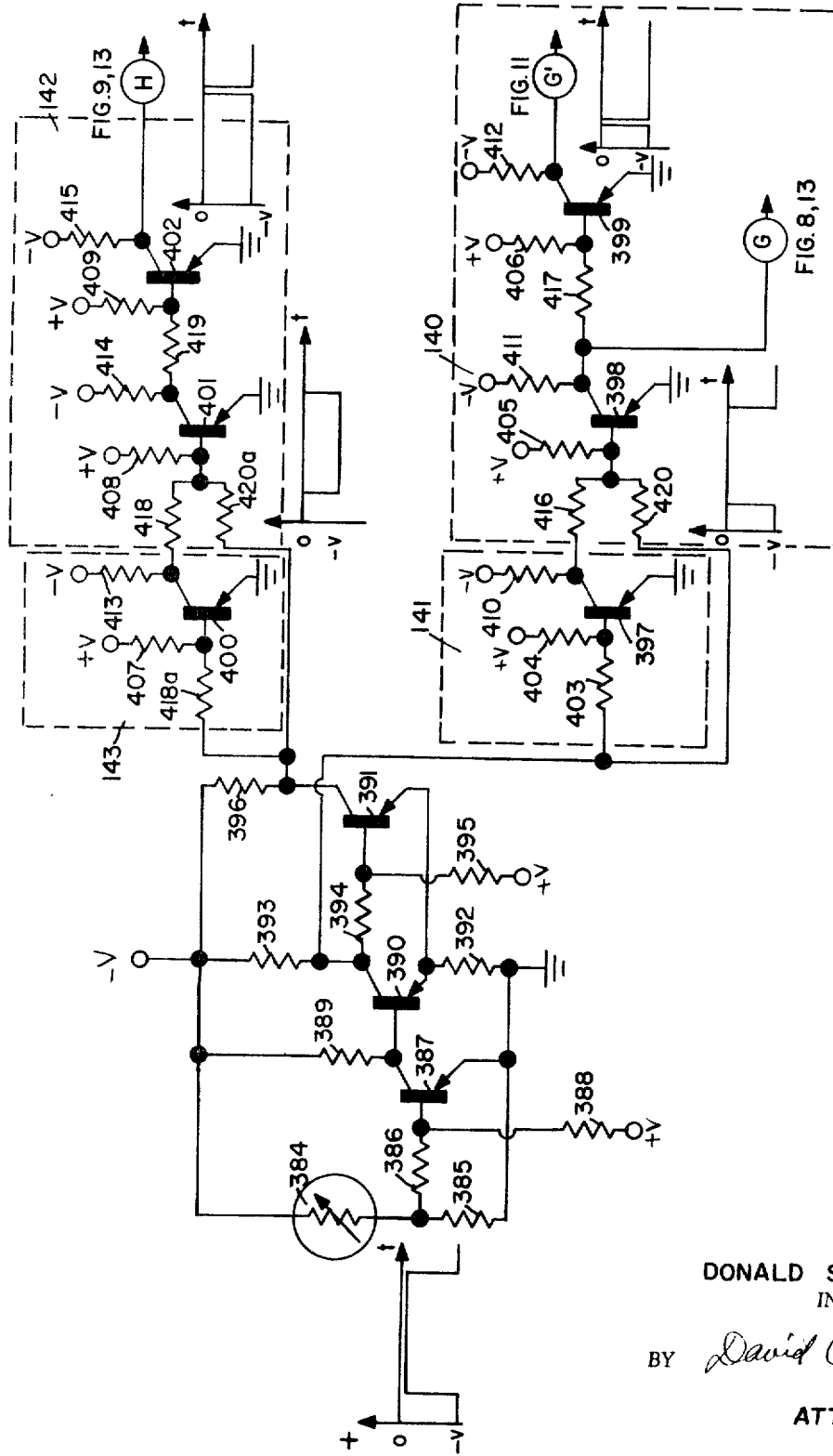
FIG. 12 is a detailed, schematic, circuit diagram of the photoelectric presence sensing, reset and interrogate pulses circuits of FIG. 7B.

The reset trigger pulse is derived from terminal G' as shown in FIGS. 7 and 12. The pulse is applied to the terminal G through a resistor 364 to the base of a transistor 365. The base of transistor 365 is coupled through a dropping resistor 366 to the positive supply voltage. The emitter is grounded. The collector is connected through a load resistor 367 to the negative supply voltage and through a dropping resistor 368 to the base of a transistor 369. The base of transistor 369 is coupled through a dropping resistor 370 to the positive supply voltage. The emitter of transistor 369 is grounded.

The collector of transistor 369 is coupled to an end of the winding 372 on a core 371 of the reset pulse driver. The other end of the winding 372 is connected to the negative supply voltage. The remaining windings are 373, 374 and 375. The winding 373 has one of its ends grounded and its other end connected through a dropping resistor 376 to the negative supply voltage. One end of the winding 374 is connected through a dropping resistor 377 to the negative supply voltage; the other end is connected to the collector of a transistor 378. The base of transistor 378 is connected to one end of the winding 375; the other end is connected through a resistor 379 to the emitter of transistor 378. The resistor 379 and the emitter of transistor 378 are connected to the base of the tranistor 380 and through a resistor 381 are connected to ground. The emitter of transistor 380 is grounded and the collector is connected through a resistor 382 to the junction between the shift-windings 308 and 313 in the shift register. The junction between the collector of transistor 380 and the resistor 382 is connected through a resistor 383 to the other end of the reset driver winding 311 of the first core element of the shift register.

*Operation*

Reset pulses are applied by way of the terminal G' to the reset pulse driver and thence to the magnetic shift register which sets a binary "1" into the first core. The remaining cores are set to binary "0." The counter trigger pulses are applied through the shift driver circuit to shift the binary "1" setting successively from core to core. The first counter pulse produces an output from the shift pulse driver which is applied to each of the cores 307, 312, 317 and 322. The direction of current flow through the shift windings is such that only that core which is set for a binary "1" can be changed from binary "1" to binary "0," initially. The effect of the first shift is to change the first core element from binary "1" to binary "0" providing an output signal to the element 335 of the request register. The switch 339 is here shown directed to the "$N_c$'s" trigger circuit.

The change of register core element from binary "1" to binary "0" produces a pulse in winding 309 which is coupled via the delay network 327 to the next shift winding 316. This changes the second memory core element from a binary "0" to a binary "1" condition. The next counter trigger pulse causes it to produce an output in the switch element 336 of the requested number register which is applied to the binary "$P_R$'s" trigger circuit associated with the transistors 343 and 347.

The effect of the counter pulses derived from the signal pulses is to produce a corresponding output reference pulse from each of the magnetic shift register elements. Synchronization of a reference pulse with its corresponding received signal pulse is assured since the counting trigger pulses are themselves derived from the received signal pulses. In this manner, self-synchronization is obtained. In contrast, prior art serial logic circuits systems require a separate timing device for synchronization. In the prior art, the absence of an output or difference voltage indicates a binary "0" only at a predetermined time. Here, however, the counting trigger pulses are derived from the received signals themselves. Furthermore, both binary states are represented by definite signal pulses. This greatly enhances the reliability of the present circuit.

The effect of obtaining the counting trigger pulses from the input of the received signal pulses is to introduce auto-synchronization of the signal pulses and the reference pulses. Since it is desired to compare the signal and the reference pulses on a pulse-by-pulse basis, and the signal pulses cause the production of the reference pulses, time synchronization between the pulses is assured. When the $n$th signal trigger pulse produces the $n$th signal, the $n$th pulse monostable trigger circuit associated with the transistors 357 and 358 produces an output at the terminal F indicative of a proper count.

*Description and explanation of the photoelectric detector circuit in FIG. 12*

In FIG. 12, there is illustrated the photoelectric detector circuit with its associated monostable trigger circuits, inverter circuit and resultant reset trigger and interrogate trigger circuitry as outlined in FIG. 7.

The presence of the data bearing medium interrupts a light beam which reduces the signal output of the photo diode circuit and produces a rectangular pulse, the leading edge of which may be used for a reset trigger pulse and the trailing edge of which may be used to develop an interrogate pulse.

The reset pulse precedes the interrogate pulse in order to reset the magnetic shift register and the memory circuits and thereby provide for interrogation only after the $n$th pulse has been counted. After $n$ pulses have been counted, the coincidence circuit is enabled to respond to the presence of a difference or mismatch signal.

In detail, a photoelectric cell, such as the diode 384, has the characteristic of increasing its resistance for dark current and decreasing its resistance in response to a light beam. As the data bearing medium moves between the photocell and a light source, its resistance sharply increases. It is connected in series with a resistor 385 to ground. The junction between the cell and the resistor 385 is connected through a resistor 386 to the base of an amplifier transistor 387. The emitter of the transistor is grounded and the base is connected through a dropping resistor 388 to the positive supply voltage. The collector is connected through a load resistor 389 to the negative supply voltage and to the base of a trigger circuit transistor 390.

The transistor 390 is operated in combination with the complementing transistor 391 to provide a monostable trigger circuit. The emitters of the transistors are connected in common through a bias resistor 392 to ground. The collector of transistor 390 is connected through a load resistor 393 to the negative supply voltage and through a dropping coupling resistor 394 to the base of transistor 391. The resistor 394 is connected through a resistor 395 to the positive supply voltage. The collector of transistor 391 is connected through a load resistor 396 to the negative supply voltage. The amplifier transistor 387 and its associated circuitry corresponds with the amplifier 138 in FIG. 7; the trigger circuit transistors 390 and 391 and their circuits correspond to the trigger circuit 139 in FIG. 7. The inverter circuit associated with a transistor 397 and the AND circuit associated with the transistor 398 correspond with the reset inverter circuit 141 and the reset AND circuit 140 in FIG. 7. The interrogate inverter circuit of 143 and the interrogate AND circuit 142 of FIG. 7 correspond with the circuits of transistor 400 and the transistor 401.

The positive-going output of the trigger circuit is coupled to the reset inverter and AND circuits. The collector of the transistor 390 is coupled through a resistor 403 to the base of the transistor 397 and through a resistor 420 to the base of the transistor 398. The negative-going output of the trigger circuit is coupled to the interrogate inverter and AND circuits. The collector of transistor 391 is coupled through a resistor 418a to the base of transistor 400 and through a resistor 420a to the base of transistor 401.

All of the transistors in the inverter and AND circuits have their emitters grounded. The bases of transistors 397–402 are coupled through dropping resistors 404–409, respectively, to the positive supply voltage. The collectors of the transistors 397–402, inclusive, are coupled through load resistors 410–415, respectively, to the negative supply voltage. The collectors of transistors 397, 398, 400 and 401 are coupled through resistors 416–419, respectively, to the bases of transistors 398, 399, 401 and 402, respectively. The reset trigger output from the transistor 398 is coupled from its collector to terminal G to provide a negative reset pulse for the memory circuits as shown in FIG. 7. The mismatch memory in FIG. 8 and the $n$th pulse or discrete signals memory in FIG. 13 show the detailed connections to terminal G. The positive reset pulse is coupled from the collector of transistor 399 to the terminal G coupling to the reset pulse driver circuit 144, as shown in FIGS. 7 and 11.

The interrogate pulse trigger is coupled from the collector of the transistor 402 to the terminal H which may be seen in FIGS. 7, 9 and 13.

*Operation*

An output pulse indicative of the presence of a carrier is amplified and applied to a monostable trigger circuit. The trigger circuit produces in its output a pair of pulses of complementary polarity. The positive going pulse is applied to the reset inverter and AND circuit to produce a trigger representative of the leading edge of the pulse. The reset trigger is applied to reset the magnetic shift register in anticipation for a new comparison, and to reset the memory circuits for a new comparison.

The other trigger is used to provide an interrogate trigger corresponding with the trailing edge of the photocell-derived pulse. The interrogate trigger occurs after all of the signal pulses have been received and compared. At that time, the coincidence circuit is enabled by the interrogate pulse, and the dropout circuit is enabled if the $n$th pulse signal is not obtained from the memory circuit.

*Description and explanation of the discrete signals memory and dropout circuits in FIG. 13*

In FIG. 13, there is illustrated the detailed schematic circuit diagram of the $n$th pulse or discrete signals memory circuit 134 and the dropout AND circuit 135 of FIG. 7.

A bistable state memory circuit associated with a pair of transistors 421 and 422 corresponds with the memory circuit 134 of FIG. 7. A AND circuit associated with a transistor 423 corresponds with the dropout AND circuit 135. The terminal F receives a signal from the $n$th pulse trigger circuit in FIG. 11 and is coupled through a resistor 424 to the base of the transistor 421. The emitters of transistors 421 and 422 are grounded. The bases are connected through dropping resistors 425 and 426, respectively, to the positive supply voltage. The base of transistor 421 is coupled through a resistor 427 to the collector of the transistor 422. The collector of transistor 421 is coupled through a resistor 428 to the base of the transistor 422. The collectors of the transistors 421 and 422 are connected through load resistors 429 and 430 to the negative supply voltage. The base of the transistor 422 is coupled through a resistor 431 to an input terminal G. Terminal G derives an input, as shown in FIGS. 7 and 12, from reset AND circuit. An output is coupled from the collector of transistor 421 to the terminal I which is directed to the coincidence AND circuit, as shown in FIGS. 7 and 9.

An output from the collector of transistor 422 is coupled through a resistor 432 to the base of the dropout transistor 423. The base of the transistor 423 is coupled through a resistor 433 to an input terminal H. The input terminal H receives an input from the interrogate AND circuit shown in FIGS. 7 and 12. The emitter of transistor 423 is grounded, and the base is coupled through a dropping resistor 434 to the positive supply voltage. The collector is coupled through a load resistor 435 to the negative supply voltage.

*Operation*

The $n$th pulse or discrete signals memory circuit controls the operation of the coincidence AND circuit 122 and the dropout AND circuit 135, in FIG. 7. Its operation is controlled by the $n$th pulse trigger derived from the counter trigger circuit 133 in FIG. 7 and the reset pulse from the reset trigger AND circuit in FIG. 7. The dropout AND circuit is enabled to dropout a data bearing medium or to provide a dropout control signal to drop out the data bearing medium in response to the interrogate pulse derived from the interrogate AND circuit 142 in FIG. 7. The dropout AND circuit is normally enabled by an output from the $n$th pulse memory circuit unless an indication of the desired $n$ signals is produced.

The memory circuit is a conventional bistable state, "flip-flop" circuit formed with the transistors 421 and 422. The two transistors are connected in complementary relation so that when one is conducting, the other is blocked and nonconducting. The conditions indicated by the voltage curves in FIG. 13 is representative of the condition after a data bearing medium has passed with the desired number of signal pulses. This condition is also indicative of a new data bearing medium proving the desired number of signals.

Thus, at terminal F, the input voltage normally corresponds to 0. This is applied to the base of transistor 421. Transistor 421, however, at that time is conducting because of the previous condition of a desired number of signals. Thus, while the voltage of terminal F calls for a positive voltage at the base of transistor 421, the cut-off-state of transistor 422 produces a negative voltage at its collector which is applied through the resistor 427 to the base of transistor 421. The transistor 421 conducts when a negative voltage appears at either one or both of the resistors 427 and 424. The collector of transistor 421 at this time, since it is conducting, is close to 0 volts. Hence, the voltage at the terminal I as indicated by the voltage curve adjacent to the terminal is close to 0 volts. The positive-going collector voltage of the transistor 421 of 0 volts is applied through the resistor 428 to the base of the transistor 422. This provides a positive voltage at the base of 422 to maintain that transistor cut off.

At a later time the reset pulse is applied to the terminal G as obtained form the reset AND circuit shown in FIGS. 7 and 12. The reset pulse is a negative-going pulse which is applied through the resistor 431 to the base of the transistor 422 to cause it to conduct heavily. The voltage at the collector of the transistor 422 rises to 0 to apply a 0 or positive voltage across the resistor 427. Since the condition has now been realized for the base of transistor 421 to go positive, transistor 421 is cut off and the voltage at its collector becomes negative. The 0 volt at the collector 422 is coupled to the resistor 432 of the dropout AND circuit to apply a 0 voltage to the base of the transistor 423.

However, the input at terminal H from the interrogate AND circuit shown in FIGS. 7 and 12 applies a negative voltage to the resistor 433. Again the condition required here is that 0 voltage be applied to both of the resistors 432 and 433 simultaneously to apply a positive voltage to the base of transistor 423. Since there at this time exists a negative voltage at the terminal H, the base of transistor 423 is negative and that transistor conducts heavily. The voltage is 0 at the collector of transistor 423. This is the condition for no dropout. However, the output of the nth pulse memory circuit in effect enables the dropout AND circuit to produce a dropout signal when the interrogate pulse comes along. Before the occurrence of the interrogate pulse, the indication of an nth pulse, the desired number of discrete signals, appears at the terminal F in the form of a negative-going pulse. The transistor 421 conducts reversing the polarity at terminal I from negative to close to 0 volt. The transistor 422 becomes cut-off and applies the negative voltage at its collector to the resistor 432 to cause the transistor 423 to conduct heavily. When the interrogate pulse comes along at a later time, applying close to 0 volt to the terminal H, the transistor 423 remains conducting because of the negative voltage applied through the resistor 432. Thus, no dropout signal appears in this condition.

For the condition where the previous medium failed to supply the required number of pulses and, indeed, was extracted from the system, there is no change when the reset pulse is applied to the terminal G. The transistor 421 is cut-off and the transistor 422 is conducting. When the nth pulse trigger comes along at terminal F, it causes transistor 421 to conduct and transistor 422 to cut off. This applies a 0 volt signal at terminal I and a negative signal to the resistor 432. Again, when the interrogate pulse comes along, the transistor 423 conducts to provide a positive voltage at its collector and no dropout signal.

The dropout condition is called for when the nth pulse trigger signal fails to appear. In this case the terminal F is at 0 volt, the transistor 421 after the reset pulse is nonconductive, and the voltage at I is negative. The voltage at the collector of 422 is 0 and applied through the resistor 432 to the base of the resistor 423. At the time the interrogate pulse is applied to the terminal H, 0 voltage is applied to both input resistors to cut-off the transistor 423 and produce a negative signal in its output corresponding with a dropout signal or requirement for extraction.

It will be apparent from the description above that the invention has broad application to the field of data processing. The invention is not restricted to the binary system described above, but may be used with any numbering system. Thus, the present invention has application wherever signals are provided in serial form and the problem of recognition of signals and data processing is involved.

While there has been described what is at present considered to be the preferred embodiment of this invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. A data processing system comprising:
   (a) a plurality of data bearing media each having a block of N bits of identification data wherein each bit has at least two possible values and where N is a predetermined integer;
   (b) a source of address data for producing a block of N bits of address data;
   (c) reading means for reading said block of N bits of identification data off of said data bearing media;
   (d) counting means coupled to said reading means for producing a full count indication if a particular block of identification data read by said reading means contains N bits of adequately manifested identification data;
   (e) a comparator for comparing a particular block of address data produced by said address data source with a particular block of identification data produced by said reading means and for producing a match indication if equality exists between said particular block of address data and said particular block of identification data;
   (f) control means coupled to said counting means and said comparator including selection indicating means for producing a selection command output signal if said counting means produces said full count indication and said comparator produces said match indication, together with rejection indicating means for producing a media rejection control signal if said counting means does not produce said full count indication.

2. The combination as set forth in claim 1 wherein said data bearing media comprise a plurality of separate data bearing pieces each having said block of N bits of identification data recorded thereon, and further including an inspection station and means responsive to the production of said selection command output signal by said selection indicating means for transmitting a selected data bearing piece to said inspection station.

3. The combination as set forth in claim 2 wherein each of said data bearing pieces comprises a planar data bearing medium having said N bits of identification data recorded thereon.

4. The combination as set forth in claim 3 wherein said N bits of identification data are recorded along an edge of said planar data bearing medium.

5. The combination as set forth in claim 4 wherein said N bits of identification data are magnetically recorded along the edge of said planar data bearing medium.

6. The combination as set forth in claim 2 further including means responsive to the production of said rejection control signal by said rejection indicating means for extracting a selected data bearing piece from said system.

7. The combination as set forth in claim 4 further including means responsive to the production of said rejection control signal by said rejection indicating means for extracting a selected data bearing piece from said system.

References Cited by the Examiner

UNITED STATES PATENTS

| | | | |
|---|---|---|---|
| 2,785,388 | 3/1957 | McWhirter et al. | 340—172.5 |
| 2,923,921 | 2/1960 | Shapin | 340—172.2 X |
| 2,996,184 | 8/1961 | Barton et al. | 340—172.5 X |
| 2,996,699 | 8/1961 | Kramskoy | 340—172.5 |
| 3,007,138 | 10/1961 | Honeiser et al. | 340—172.5 |
| 3,025,499 | 3/1962 | Evans et al. | 340—172.5 |
| 3,075,178 | 1/1963 | James | 340—172.5 |
| 3,108,694 | 10/1963 | Crain et al. | 340—172.5 |
| 3,225,175 | 12/1965 | Hyypolainen | 235—61.7 |

ROBERT C. BAILEY, *Primary Examiner.*

P. J. HENON, *Assistant Examiner.*